United States Patent
Fan et al.

(10) Patent No.: US 10,718,738 B2
(45) Date of Patent: Jul. 21, 2020

(54) MINIATURIZED DISCHARGE PHOTO-IONIZATION DETECTOR

(71) Applicant: THE REGENTS OF THE UNIVERSITY OF MICHIGAN, Ann Arbor, MI (US)

(72) Inventors: Xudong Fan, Saline, MI (US); Hongbo Zhu, Ann Arbor, MI (US); Katsuo Kurabayashi, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 316 days.

(21) Appl. No.: 15/685,139

(22) Filed: Aug. 24, 2017

(65) Prior Publication Data

US 2018/0059058 A1 Mar. 1, 2018

Related U.S. Application Data

(60) Provisional application No. 62/378,770, filed on Aug. 24, 2016.

(51) Int. Cl.
*G01N 27/64* (2006.01)
*G01N 27/66* (2006.01)

(52) U.S. Cl.
CPC ............ *G01N 27/66* (2013.01); *G01N 27/64* (2013.01)

(58) Field of Classification Search
None
See application file for complete search history.

(56) References Cited

U.S. PATENT DOCUMENTS

| 5,319,282 A * | 6/1994 | Winsor ............... H01J 61/0672 313/492 |
| 5,855,850 A | 1/1999 | Sittler |
| 2012/0136268 A1 | 5/2012 | Li et al. |

(Continued)

OTHER PUBLICATIONS

Zhu, Hongbo, et al., "Low-Power Miniaturized Helium Dielectric Barrier Discharge Photoionization Detectors for Highly Sensitive Vapor Detection," Analytical Chemistry, vol. 88, pp. 8780-8786 (Aug. 25, 2016), Supplementary Information (S-1-15).

(Continued)

*Primary Examiner* — Paul S Hyun
(74) *Attorney, Agent, or Firm* — Harness, Dickey & Pierce, P.L.C.

(57) ABSTRACT

A discharge ionization current detector for ionizing and detecting a sample component where the sample component is ionized by UV light is provided. The detector includes a UV light source, and a microfluidic channel having a first surface including a conducting or semiconducting material and an opposing second surface including a conducting or semiconducting material, one of the first surface and the second surface being a collection electrode and the other of the first surface and the second surface being a bias electrode, the microfluidic channel being configured to receive a sample component. The microfluidic channel is in fluid communication with the UV light source such that, when activated, UV light from the UV light source can enter the microfluidic channel and ionize the sample component, which releases an electron, and the ionized sample component and electron are detected by the collection and bias electrodes.

20 Claims, 23 Drawing Sheets

(56) References Cited

U.S. PATENT DOCUMENTS

2013/0193318 A1* 8/2013 Land ................. H01J 49/10
 250/282
2013/0221972 A1 8/2013 Uchiyama
2015/0130473 A1 5/2015 Agah et al.

OTHER PUBLICATIONS

Zhu, Hongbo, et al., "Flow-Through Microfluidic Photoionization Detectors for Rapid and Highly Sensitive Vapor Detection," Lab Chip (2015) vol. 15, pp. 3021-3029, Supplementary Information (pp. 1-13).
International Search Report and Written Opinion of the International Searching Authority dated Dec. 4, 2017 regarding PCT/US2017/048422.
Akbar, Muhammad, et al "Chip-Scale Gas Chromatography: From Injection Through Detection" Microsystems & Nanoengineering (2015) 1, www.nature.com/micronano.
Narayanan, Shree, et al. "A Micro Helium-Discharge PhotoIonization Detector for Gas Sensing" IEEE (2013).
Akbar, M., et al. "GC-On-Chip: Integrated Column and Photoionization Detector" Lab Chip (2015) 15, pp. 1748-1758.

* cited by examiner

MINIATURIZED DISCHARGE PHOTO-IONIZATION DETECTOR

CROSS-REFERENCE TO RELATED APPLICATIONS

This application claims the benefit and priority of U.S. Application Ser. No. 62/378,770 filed on Aug. 24, 2016. The entire disclosure of the above application is incorporated herein by reference.

GOVERNMENT INTEREST

This invention was made with government support under RD-83564401-0, awarded by the Environmental Protection Agency. The government has certain rights in the invention.

FIELD

The present disclosure relates to miniaturized discharge photoionization detector.

BACKGROUND

This section provides background information related to the present disclosure which is not necessarily prior art. This section also provides a general summary of the disclosure, and is not a comprehensive disclosure of its full scope or all of its features.

Gas chromatography (GC) is a common, powerful method for measuring quantities of specific substances in a sample. Photoionization detectors (PIDs) are being widely used in GC systems due to their high sensitivity and large dynamic range. In a typical design, a PID consists of a vacuum UV (VUV) lamp filled with low-pressure rare gases such as xenon, krypton, and argon, which generate photons ranging from 9.6 eV to 11.8 eV, and a sealing window made of a UV transparent crystal (e.g., LiF, $MgF_2$, and $CaF_2$). However, those PIDs suffer from a very limited lifetime of a few hundred to a couple of thousand hours and gradual performance degradation due to gas leakage and window degradation caused by crystal solarization, water etching, and contamination of chemical compounds. Thus, constant maintenance and calibration are needed during their entire operation lifetime. Furthermore, although those PIDs are able to provide sufficient photon energy (e.g., 11.8 eV by argon based PIDs with a LiF window) to ionize most of chemical compounds, there still exist many important compounds with the ionization potential (IP) above or close to 11.8 eV, such as Freon (IP: 11.77 eV-12.91 eV), methane (IP: 12.98 eV), chlorine trifluoride (IP: 12.65 eV), dichlorofluoromethane (IP: 12.39 eV), phosgene (IP: 11.77 eV), and ethane (IP: 11.65 eV), just to name a few, which cannot be analyzed with those PIDs.

Atmospheric pressure rare gas discharge based PIDs usually have a windowless design, which maximizes UV transmission and can potentially extend the PID lifetime. Helium is typically used in this type of PID. Known as Hopfield emission, which results from the transition from the diatomic helium state to the dissociative helium state, photons ranging from 13.5 eV to 17.5 eV can be generated during the helium discharge process, making the helium discharge PID (HD-PID) virtually a universal detector for gas analysis. In an HD-PID, helium plasma is usually generated by direct current (DC) discharge, pulsed discharge, or dielectric barrier discharge (DBD). DC discharge relies on high voltage (or electric field) to break down helium into positive ions and electrons, thus generating gas plasma. Recently, a miniaturized HD-PID based on DC discharge was demonstrated with 550 VDC across a 20 μm gap and power consumption of only 1.4 mW. A detection limit on the order of 10 pg was achieved. Pulsed discharge is also called pulsed DC discharge. The operation principle is similar to DC discharge, but uses 1 kHz-1 MHz pulses to lower average power consumption and achieve better and more stable ionization/excitation. The popular PIDs from Valco Instruments are based on the pulsed discharge technology. Recently, a micro-pulsed discharge PID was also developed with the size as large as 10 $cm^3$ and a detection limit of a few pg. However, one of the major drawbacks of DC discharge is the sputtering effect, i.e., high-speed ions continuously bombard the cathode material, which limits the lifetime of the detector and requires constant maintenance of electrodes and chambers (such as electrode replacement and discharge chamber cleaning). For pulsed discharge, since the duty cycle and hence the average electrical power are lower, the overall sputtering effect is lower. However, due to high instantaneous power, the sputtering cannot be completely prevented.

DBD uses high-voltage (1-100 kV) high-frequency (up to a few MHz) potential to generate atmospheric pressure plasma. In a DBD design, dielectric materials (e.g., glass, polymer, and quartz, etc.) are placed on the electrode surface facing the discharge chamber, thus forming a protection layer. Compared to the two aforementioned discharge methods, the DBD method is advantageous in a homogenous discharge and very long electrode operation lifetime. Therefore, it has become the preferred method for atmospheric pressure plasma generation and been applied in numerous applications. Recently, a few DBD based helium discharge PIDs became commercially available (such as BID-2010 Plus from Shimadzu and DBDID from ABB Inc.) with the detection limit ranging from a few tens of picogram to sub-picogram. However, the existing DBD based HD-PIDs (such as BID-2010 Plus and DBDID) are bulky (similar to the dimensions and weight of a commercial FID) and power intensive (DBDID: 12 W) and require a large auxiliary helium flow rate (50-100 mL/min) and long warm-up time. While those HD-PIDs can be used in benchtop GC systems, they are not suitable for portable or micro-GC systems for field applications. Accordingly, advanced DBD based HD-PIDs are desired that address these shortcomings.

Further areas of applicability will become apparent from the description provided herein. The description and specific examples in this summary are intended for purposes of illustration only and are not intended to limit the scope of the present disclosure.

SUMMARY

This section provides a general summary of the disclosure, and is not a comprehensive disclosure of its full scope or all of its features.

In various aspects, the current technology provides a discharge ionization current detector for ionizing and detecting a sample component where the sample component is ionized by UV light. The detector includes a UV light source, and a microfluidic channel having a first surface having a conducting or semiconducting material and an opposing second surface having a conducting or semiconducting material, one of the first surface and the second surface being a collection electrode and the other of the first surface and the second surface being a bias electrode. The microfluidic channel being configured to receive a sample component. The microfluidic channel is in fluid communication with the UV light source such that, when activated, UV light from the UV light source can enter the microfluidic channel and ionize the sample component, which releases an electron, and the ionized sample component and electron are detected by the collection and bias electrodes.

In one aspect, the detector further includes a wall separating the UV light source from the microfluidic channel, the wall including an aperture that selectively allows UV light to pass from the UV light source to the microfluidic channel.

In one aspect, the UV light source includes a plasma generation means including a first plasma induction electrode and an opposing second plasma induction electrode, wherein the first and second plasma induction electrodes are disposed on opposing dielectric barrier layers.

In one aspect, the dielectric barrier layers individually have a thickness of greater than or equal to about 1 µm to less than or equal to about 500 µm.

In one aspect, the plasma induction electrodes have a distance therebetween of below 3 mm.

In one aspect, the dielectric barrier layers of the plasma generation means individually have a thickness of greater than or equal to about 1 µm to less than or equal to about 500 µm and the plasma induction electrodes have a distance therebetween of less than or equal to about 3 mm.

In one aspect, the microfluidic channel further includes at least one sample component inlet portion at a first end and at least one outlet portion, such that the at least one sample component inlet portion allows a sample component to flow through the microfluidic channel and be ionized by UV light and the outlet portion allows ionized sample component to be removed from the detector.

In one aspect, the detector further includes an outlet channel that extends from the microfluidic channel to the outlet portion.

In one aspect, the UV light source includes a plasma generation means including a first dielectric barrier layer having a first conductive material disposed on a first exposed surface of the first dielectric barrier layer, and an opposing second dielectric barrier layer having a second conductive material disposed on a second exposed surface. A plasma-generation void is defined between the first and second dielectric barriers, the plasma-generation void being either a plasma-generation channel or a plasma-generation chamber.

In one aspect, the plasma-generation void is a plasma-generation chamber having a volume of greater than or equal to about 1 $mm^3$ to less than or equal to about 20 $mm^3$.

In various aspects, the current technology also provides a discharge ionization current detector for ionizing and detecting a sample component where the sample component is ionized using plasma created by discharge. The detector includes a sample component detection portion including a sample component inlet, a microfluidic channel extending from the inlet, a first electrode having a surface that defines a first side wall of the microfluidic channel, and a second electrode having a surface that defines a second side wall of the microfluidic channel, the second side wall being opposite the first side wall, wherein the microfluidic channel has a width defined by the space between the first electrode and the second electrode of greater than or equal to about 1 µm to less than or equal to about 1 mm. The detector also includes a plasma generation portion including a gas inlet, a plasma-generation void defined between a bottom dielectric barrier layer and a top dielectric barrier layer and in fluid communication with the gas inlet, the top dielectric barrier being opposite the bottom dielectric barrier, wherein the bottom dielectric barrier layer and the top dielectric barrier layer independently have a thickness of greater than or equal to about 1 µm to less than or equal to about 500 µm. The microfluidic channel of the sample component detection portion is in fluid communication with the plasma-generation void of the plasma generation portion.

In one aspect, the detector also includes a first sample component outlet channel extending from the microfluidic channel to a first sample component outlet at a side of the detector, wherein one of a second surface of the first electrode and a second surface of the second electrode defines a side wall of the first sample component outlet channel.

In one aspect, the detector further includes a second sample component outlet channel extending from the microfluidic channel to a second sample component outlet at a side of the detector, wherein the other of the second surface of the first electrode or the second surface of the second electrode defines a side wall of the second sample component outlet channel.

In one aspect, the first outlet channel is longitudinally bifurcated by a wall having an aperture that selectively allows ionizing light generated from the plasma generation portion to enter the sample component detection portion.

In one aspect, the wall separates the plasma generation portion from the sample component detection portion.

In one aspect, the plasma-generation void is a plasma-generation channel having substantially the same dimensions as the microfluidic channel.

In one aspect, the plasma-generation void is a plasma-generation chamber having a volume of greater than or equal to about 1 $mm^3$ to less than or equal to about 20 $mm^3$.

In one aspect, guard columns are disposed in the analyte inlet and the gas inlet.

The current technology further provides a method of detecting an analyte. The method includes generating plasma that emits ionizing light in a plasma-generation void defined between a bottom dielectric barrier layer and a top dielectric barrier layer, the bottom dielectric barrier layer and the top dielectric barrier layer independently having a thickness of greater than or equal to about 1 µm to less than or equal to about 500 µm, applying a bias voltage across a microfluidic channel disposed between a first electrode that defines a first wall of the microfluidic channel and a second electrode that defines a second wall of the microfluidic channel, the second wall being opposite to the first wall at a distance of greater than or equal to about 1 µm to less than or equal to about 1 mm, delivering a sample component through the microfluidic channel, wherein the ionizing light contacts the sample component and ionizes the sample component to generate a sample component cation and an electron, and detecting the sample component cation and electron at the first and second electrodes.

In one aspect, the plasma is generated from a gas selected from the group consisting of helium (He), Neon (Ne), Argon (Ar), Krypton (Kr), nitrogen ($N_2$), and combinations thereof.

In one aspect, the ionizing light passes through an aperture of a wall prior to contacting and ionizing the sample component, and wherein the wall inhibits the plasma from contacting the sample component and the electrodes.

In one aspect, the sample component is separated from a sample mixture by gas chromatography prior to the delivering.

DRAWINGS

The drawings described herein are for illustrative purposes only of selected embodiments and not all possible implementations, and are not intended to limit the scope of the present disclosure.

Figures 7A, 7B:
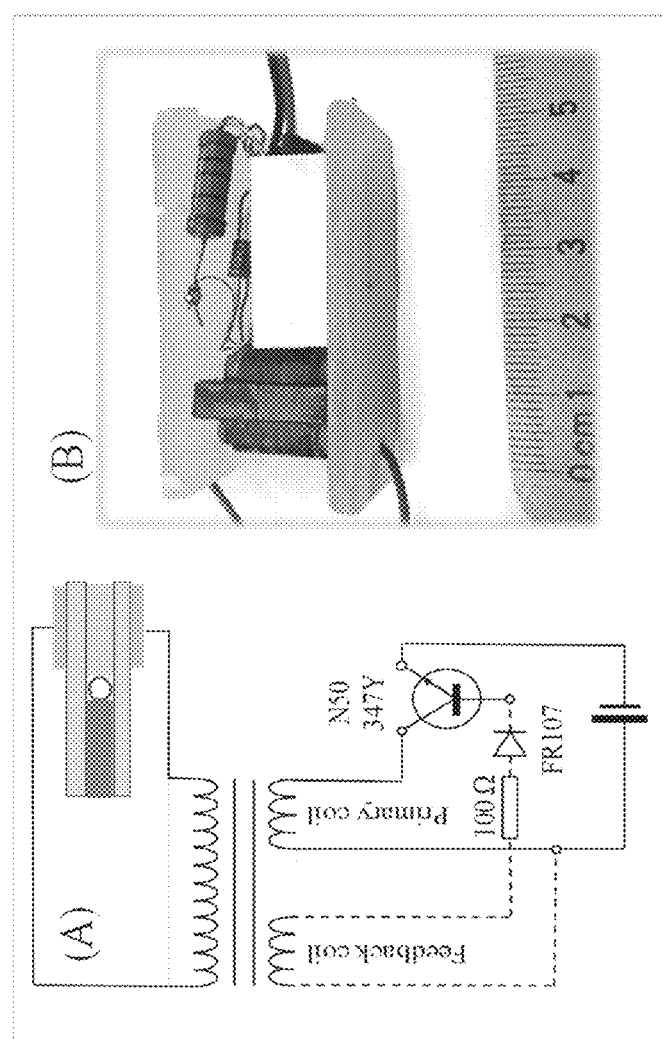

FIG. 7A is circuitry for helium discharge plasma excitation. DC input: 1.5 V and 257 mA. AC output: 7.7 kHz, 4 kV.

FIG. 7B S2B is a picture of the power supply.

Figure 8:
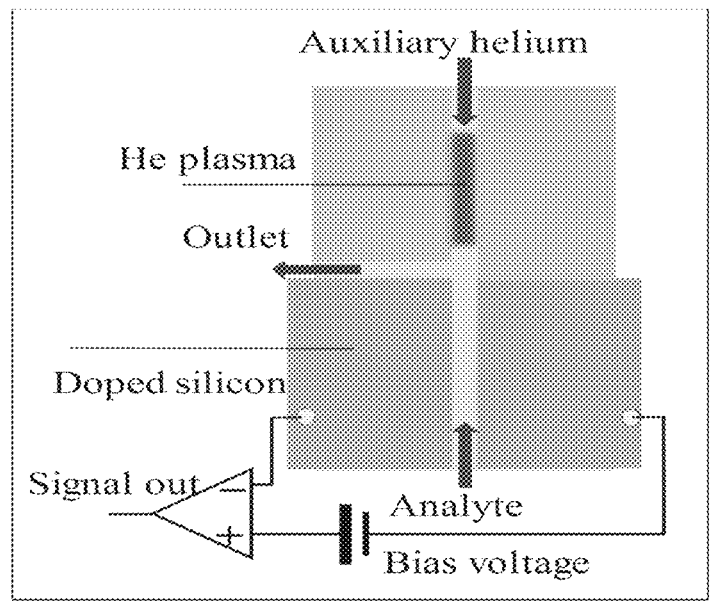

FIG. 8 S3 is circuitry for signal read-out.

Figure 9:
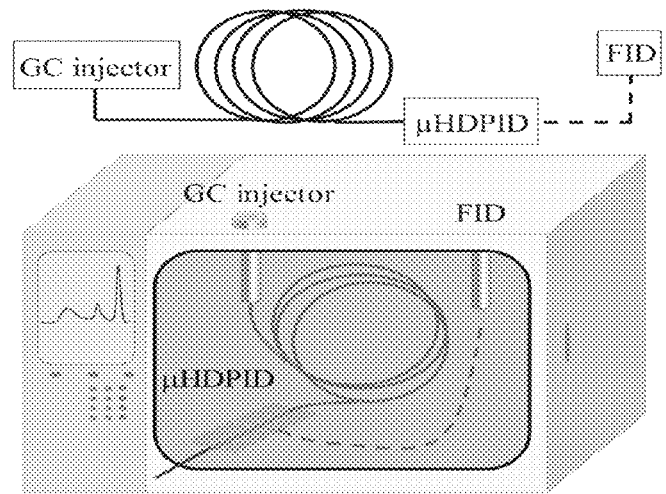

FIG. 9 shows the experimental setup.

Figure 10:
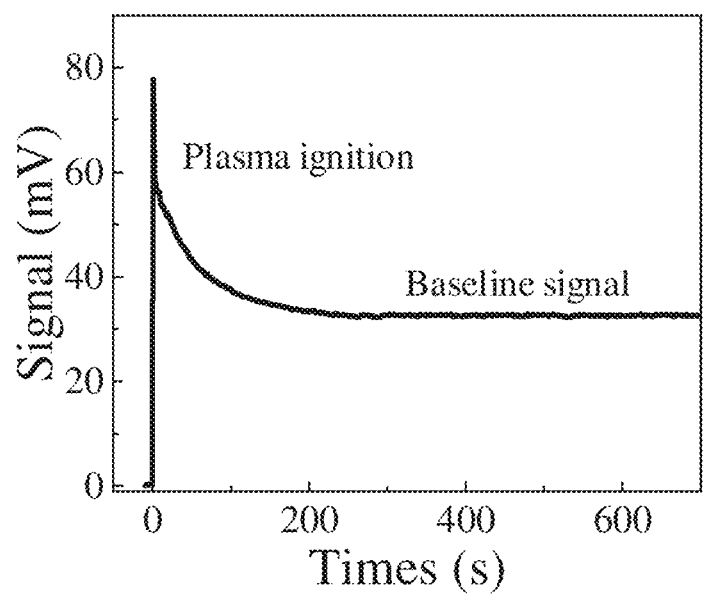

FIG. 10 is a graph showing plasma ignition.

Figure 11:
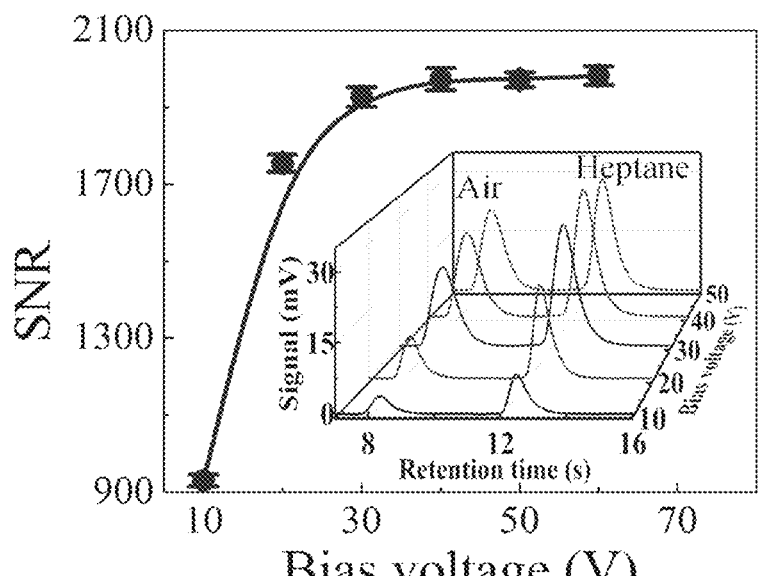

FIG. 11 illustrates a signal to noise ratio (SNR) for 2.356 ng heptane as a function of bias voltage of collection electrodes at 20° C.

Figure 12A:
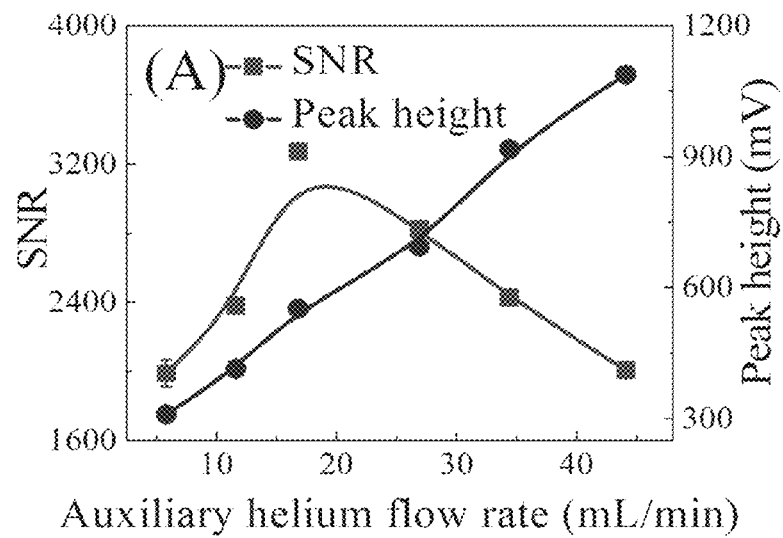

FIG. 12A illustrates response signal and corresponding signal to noise ratio (SNR) for 2.356 ng heptane at various auxiliary helium flow rates. Carrier gas flow was fixed at 1 mL/min.

Figure 12B:
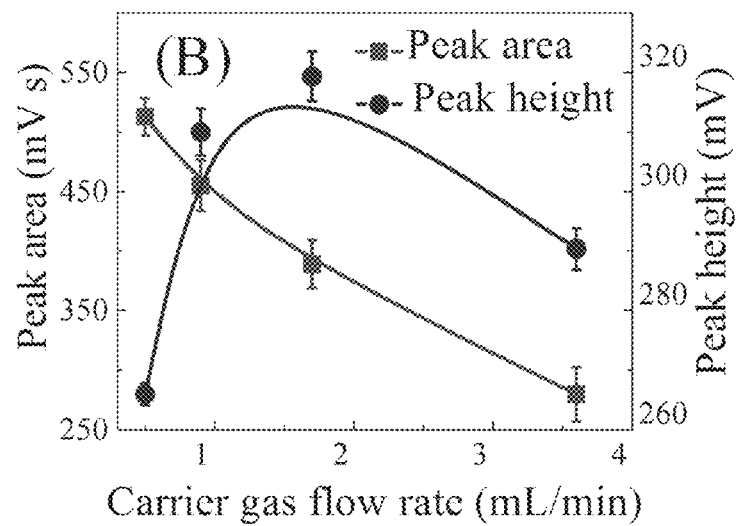

FIG. 12B illustrates response signal and corresponding signal to noise ratio (SNR) for 2.356 ng heptane at various carrier flow rates.

Figure 13:
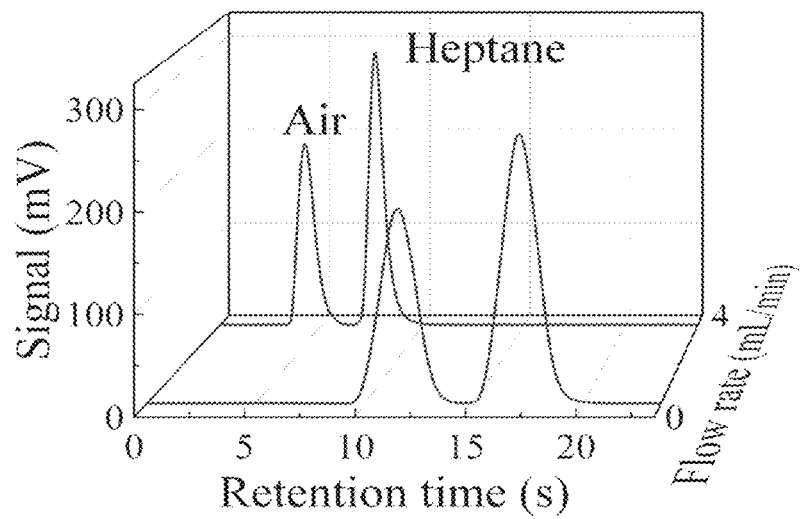

FIG. 13 illustrates eluent peaks becoming sharper and elution time becoming shorter at a higher carrier gas flow rate.

Figure 14:
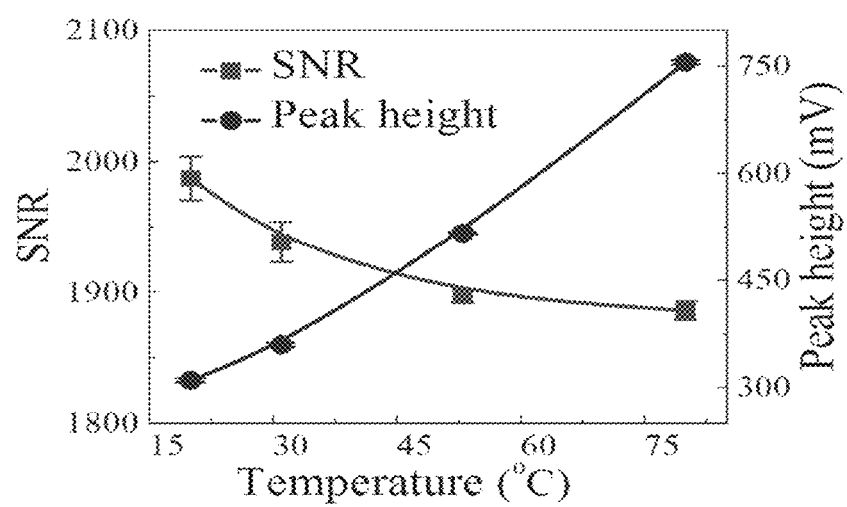

FIG. 14 illustrates response signal and corresponding signal to noise ratio (SNR) for 2.356 ng heptane as a function of temperature.

Figure 15A:
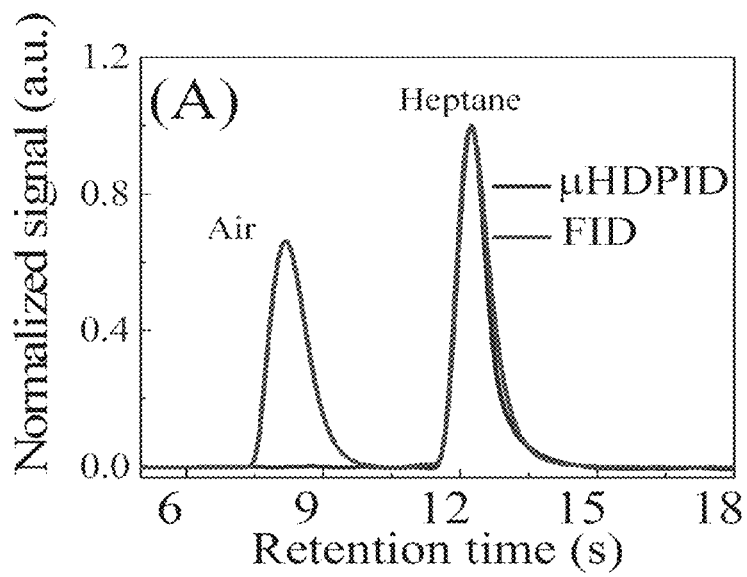

FIG. 15A illustrates normalized signal obtained with μHDBD-PID and FID. Carrier gas flow rate was 1 mL/min. Auxiliary flow pressure was 1 psi. FWHM of 0.85 s and 0.72 s was obtained, respectively, for μHDBD-PID and FID. 1 m Rtx-1 column was used for air and heptane separation.

Figure 15B:
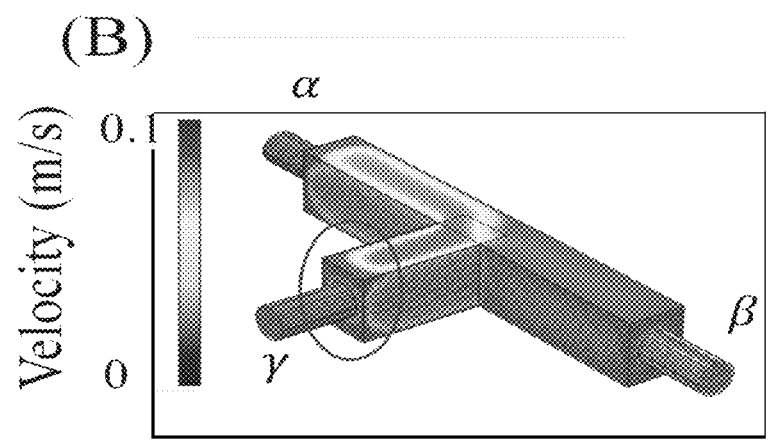

FIG. 15B is a COMSOL Multiphysics® 3D simulation of helium flow with an auxiliary helium flow rate of 5.8 mL/min from inlet α and a carrier gas flow rate of 1 mL/min from inlet β. Outlet γ serves a common outlet with 101.35 kPa.

Figure 16A:
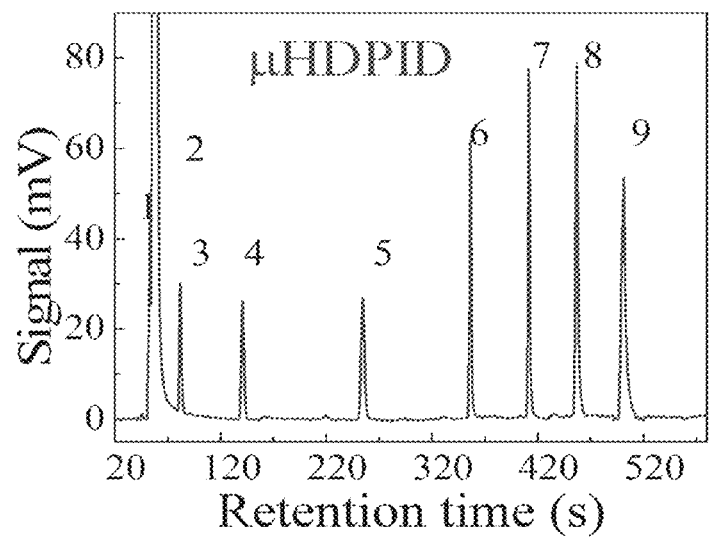
Figure 16B:
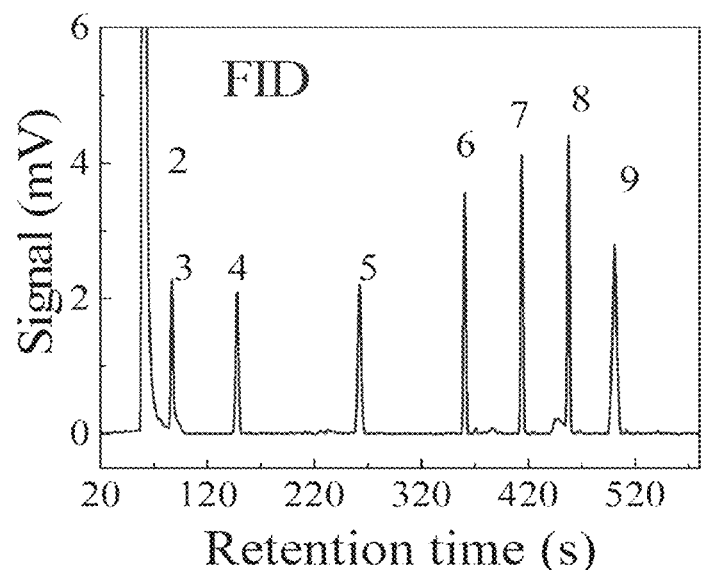

FIGS. 16A and 16B are graphs showing 0.1 μL (100 split ratio) aliphatics mixture ($C_5$-$C_{12}$) was detected by μHDBD-PID. The mixture was separated via a 7-m long Rtx®-VMS column at a flow rate of 1.5 mL/min with temperature ramping from T=40° C. for 2 min and then to 200° C. at a rate of 30° C./min. 1. Water, 2. Methanol and Pentane, 3. Hexane, 4. Heptane, 5. Octane, 6. Nonane, 7. Decane, 8. Undecane, 9. Dodecane. FWHM (in units of second) of μHDBD-PID and FID were: Hexane (2.00, 2.14); Heptane (2.84, 2.98); Octane (3.59, 3.29); Nonane (1.95, 2.12); Decane (1.86, 2.40); Undecane (2.31, 2.32); Dodecane (4.06, 4.14).

Figure 17A:
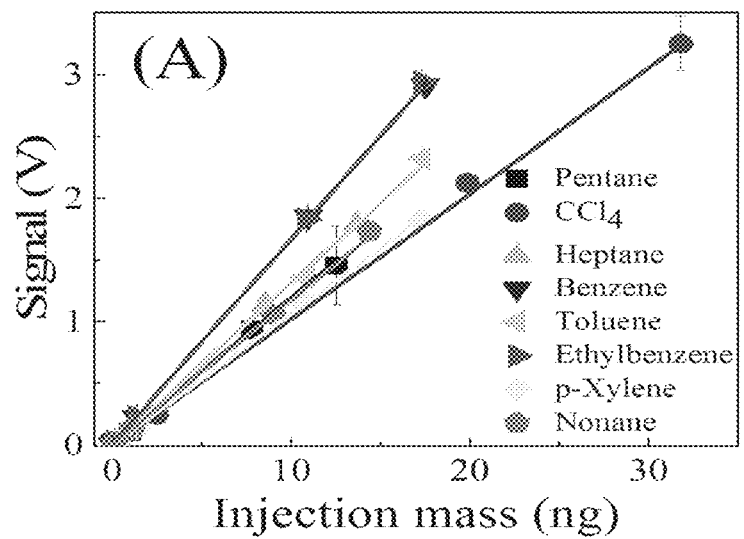

FIG. 17A illustrates a μHDBD-PID linearity test for eight VOCs. Peak height as a function of injection mass in the linear-linear scale. Solid curves are linear fits with the related parameters given in Table S2.

Figure 17B:
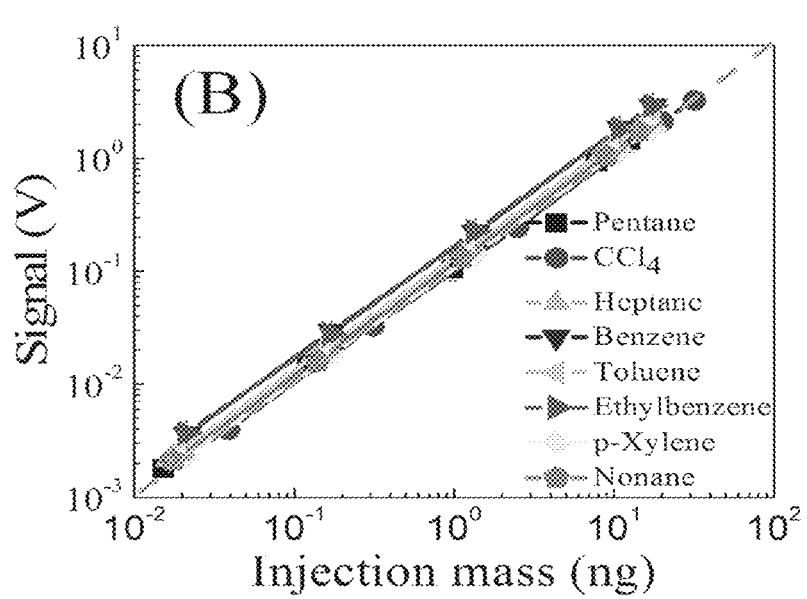

FIG. 17B illustrates a μHDBD-PID linearity test for eight VOCs showing the corresponding data and curves in FIG. 8A plotted on the log-log scale.

Figure 18:
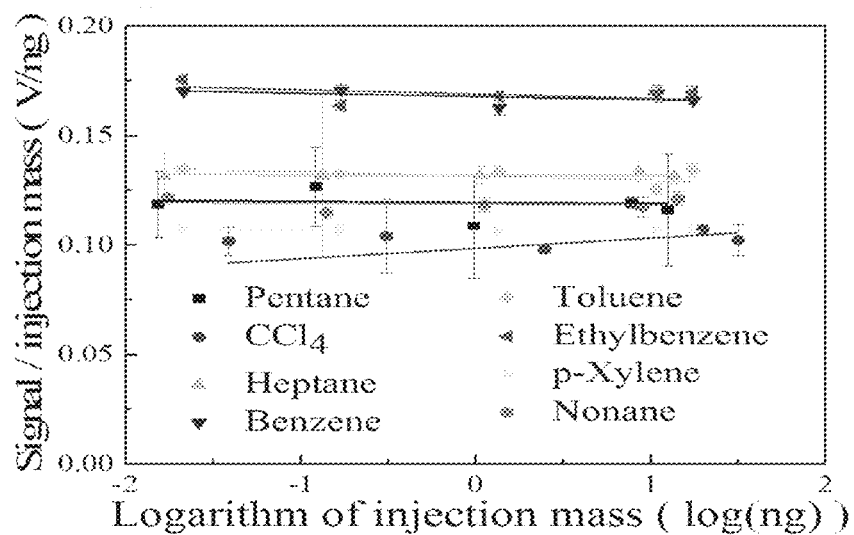

FIG. 18 is a plot of peak height divided by injection mass as a function of logarithm of injection mass for eight VOCs in FIG. 8. The slope of each curve is: Pentane ($-4.27 \times 10^{-4}$), $CCl_4$ ($4.7 \times 10^{-3}$), Heptane ($-1.06 \times 10^{-4}$), Benzene ($-1.48 \times 10^{-3}$), Toluene ($1.87 \times 10^{-3}$), Ethylbenzene ($-1.94 \times 10^{-3}$), p-Xylene ($-4.21 \times 10^{-4}$), and Nonane ($-3.35 \times 10^{-4}$).

Figure 19:
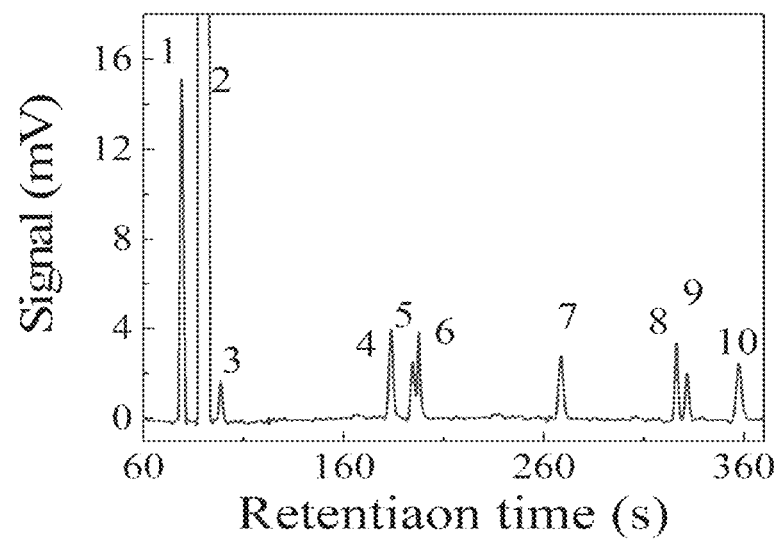

FIG. 19 shows μHDBD-PID detection of VOCs mixture prepared in methanol with 195 ppm (V/V) concentration for all 8 VOCs. The mixture was separated by GC using a 7-m long Rtx®-VMS column. The injected mass and FWHM were: 1. Water (trace, 2.00 s); 2. Methanol (N/A, 2.01 s); 3. Pentane (15.28 pg, 1.84 s); 4. Carbon tetrachloride (38.83 pg, 2.33 s); 5. Heptane (16.7 pg, 2.34 s); 6. Benzene (21.39 g, 1.52 s); 7. Toluene (21.17 pg, 2.58 s); 8. Ethylbenzene (21.14 pg, 1.79 s); 9. p-Xylene (21.02 pg, 1.98 s); 10. Nonane (17.53 pg, 2.91 s). Temperature ramping: T=25° C. for 0.6 min and then to 200° C. at a rate of 30° C./min. Helium was used as the carrier gas at a flow rate of 1.5 mL/min.

Figure 20:
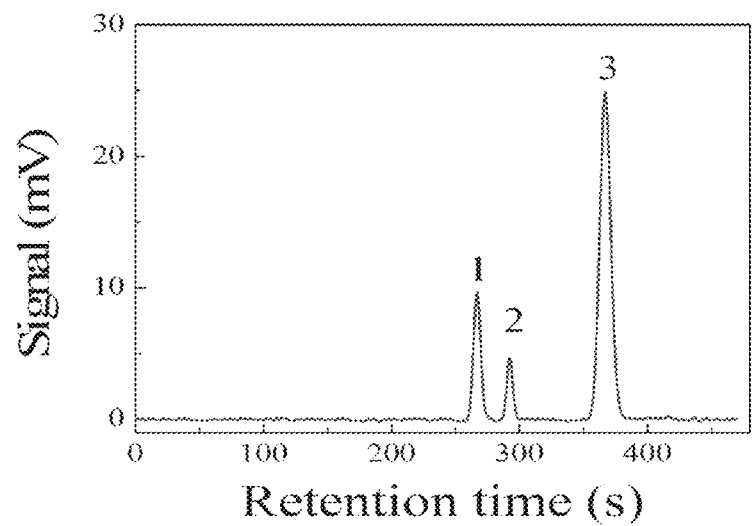

FIG. 20 illustrates μHDBD-PID detection of permanent gases: 1. Hydrogen (30% V/V); 2. Oxygen (10% V/V); and 3. Nitrogen (60% V/V), with a total injection volume of 10 μL via gas-tight syringes with shut-off valves (50R-V-GT SGE) and a spilt ratio of 100.

Figure 21:
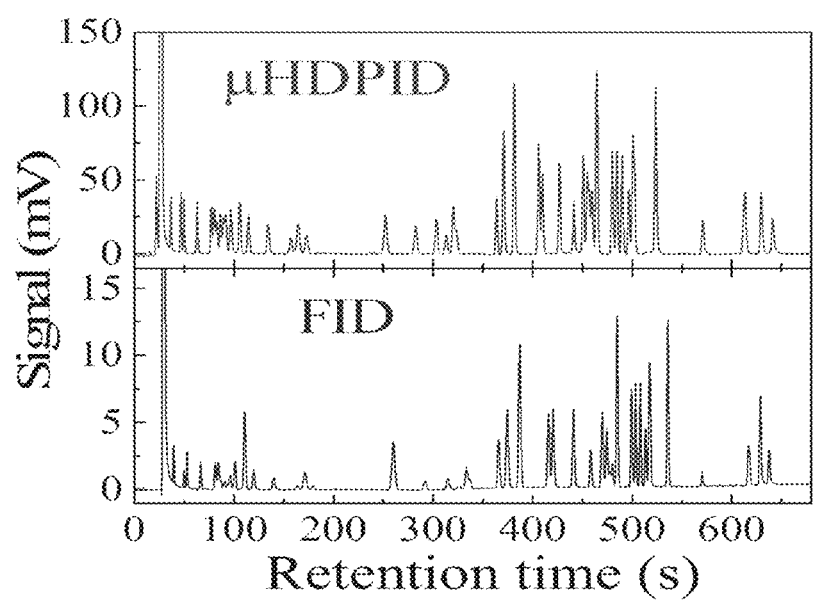

FIG. 21 shows 0.1 μL (with a 100 split ratio) EPA 8260 VOC mixture (purchased from Sigma-Aldrich P/N 500607, containing 51 analytes) with 47 VOC peaks detected by both μHDBD-PID and FID.

Figure 22:
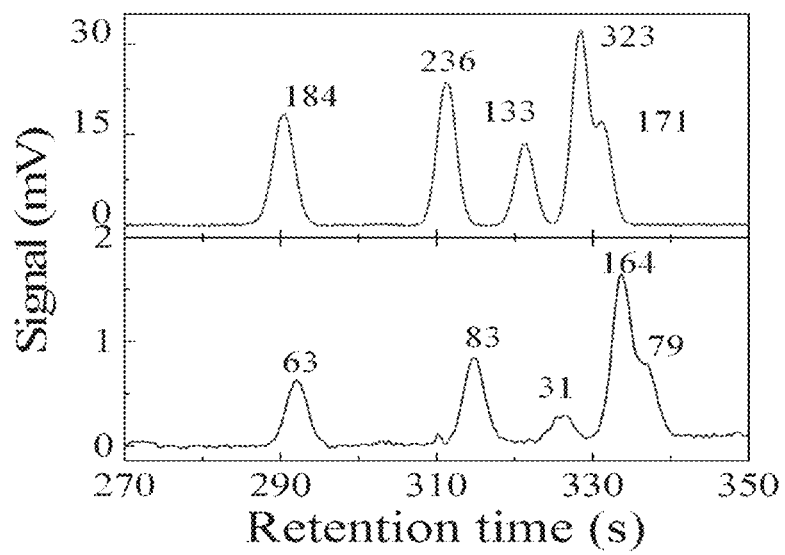

FIG. 22 illustrates an enlarged part of FIG. 10 with the SNR labeled on the corresponding peak. Slight offset in the peak elution times between μHDBD-PID and FID results is due to a slight difference in temperature ramping during two separations.

Figure 23:
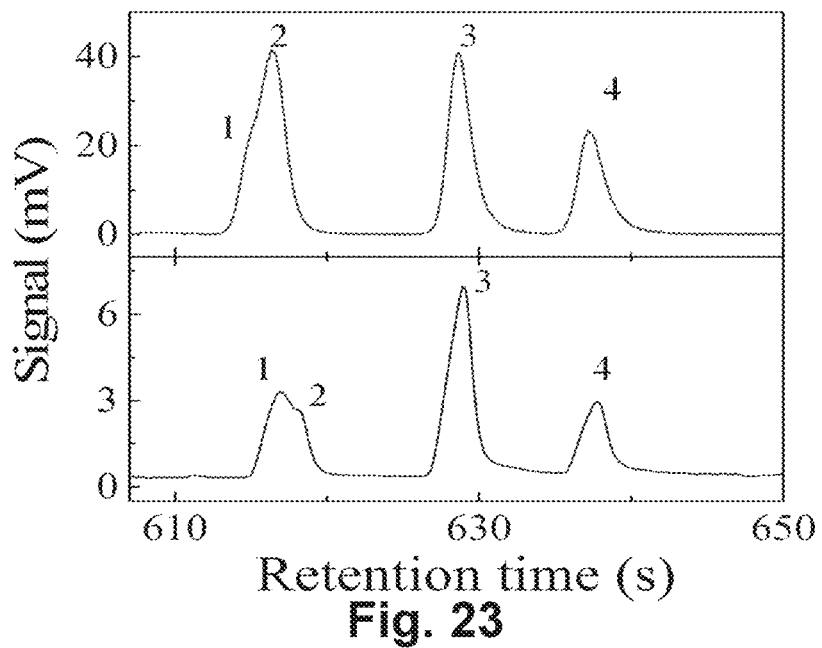

FIG. 23 illustrates an enlarged part of FIG. 10. Identified peaks and the corresponding FWHM values of μHDBD-PID and FID are: 1. hexachloro-1,3-butadiene (not available due to co-elution), 2. 1,2,4-trichlorobenzene (not available due to co-elution), 3. Naphthalene (1.95 s/1.78 s), 4 1,2,3-trichlorobenzene (2.14 s/1.93 s). Slight offset in the peak elution times between the μHDBD-PID and FID results is due to a slight difference in temperature ramping during two separations.

Figure 24:
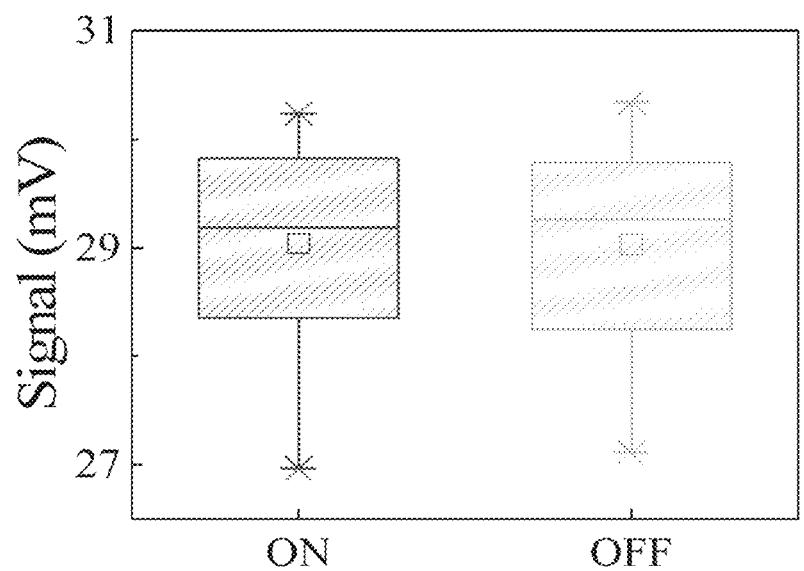

FIG. 24 is a boxplot showing testing of non-destructive nature of the μHDBD-PID. Boxplot of 15 times of 2.356 ng heptane injection under the plasma "ON" and "OFF" condition. A p-value of 0.9779 was calculated using an unpaired two sample t-test for equal population means with same sample size.

Figure 25:
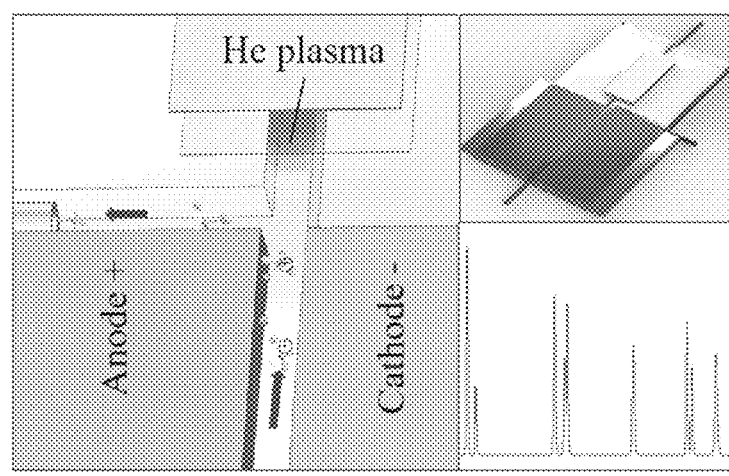

FIG. 25 is an enlarged 3-dimensional rendering of a micro-helium discharge photoionization detector (μHDBD-PID).

Figure 26A:
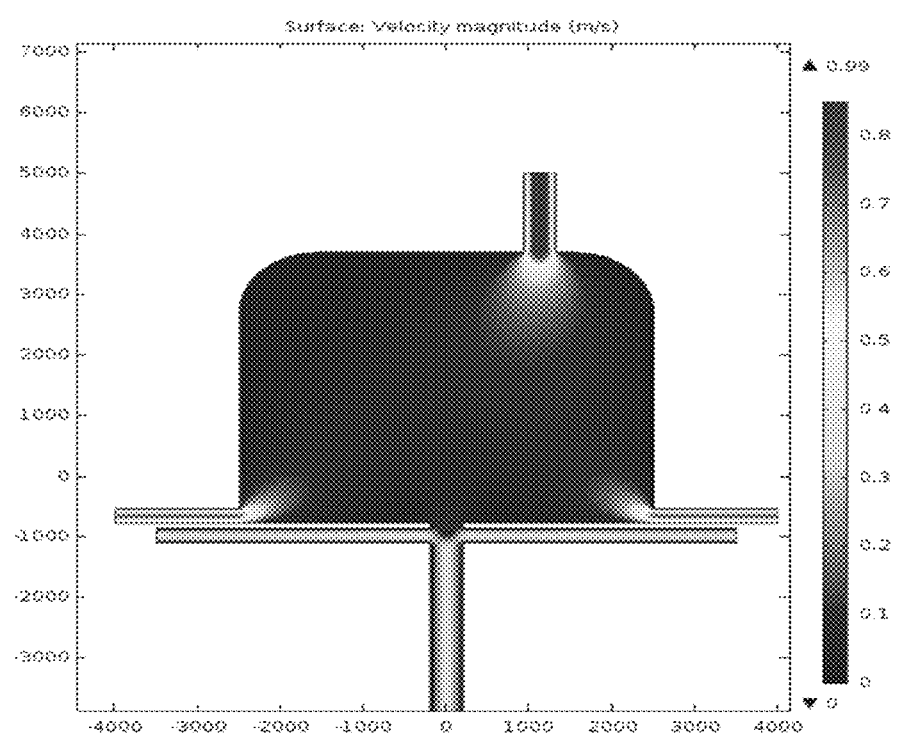

FIG. 26A is an image of a detector design showing surface velocity magnitude.

Figure 26B:
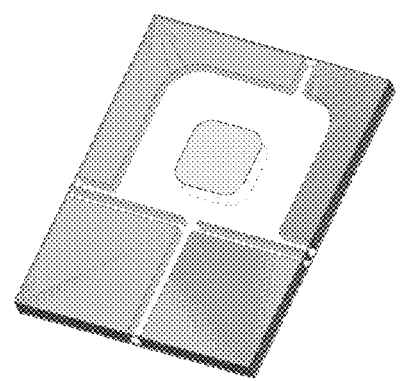

FIG. 26B is a design of a discharge photoionization detector made according to various aspects of the current technology.

Figure 27A:
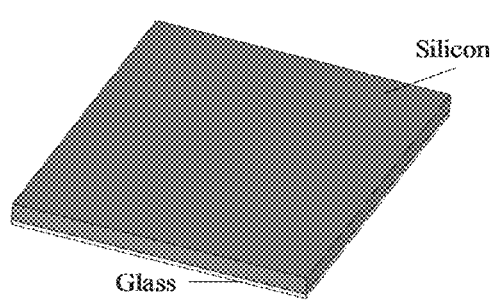

FIG. 27A is an illustration showing anodic bonding during fabrication of a discharge photoionization detector according to various aspects of the current technology.

Figure 27B:
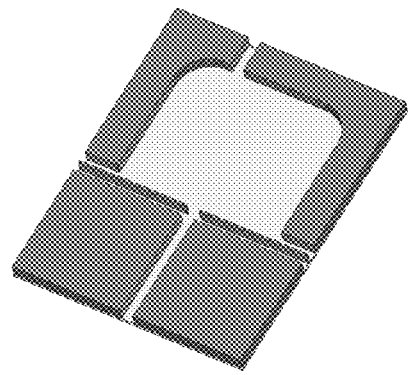

FIG. 27B is an illustration showing flow channel etching during fabrication of a discharge photoionization detector according to various aspects of the current technology.

Figure 27C:
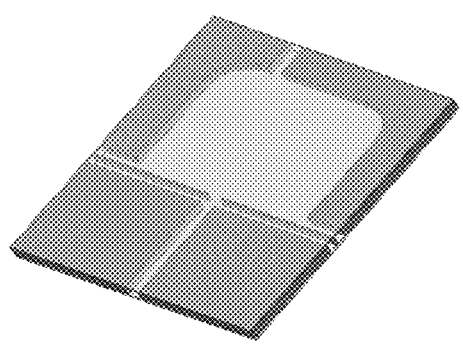

FIG. 27C is an illustration showing anodic bonding during fabrication of a discharge photoionization detector according to various aspects of the current technology.

Figure 27D:
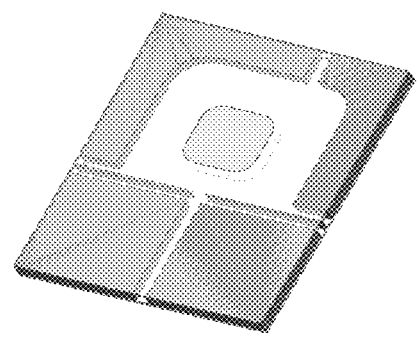

FIG. 27D is an illustration showing electrode deposition during fabrication of a discharge photoionization detector according to various aspects of the current technology.

Figure 28:
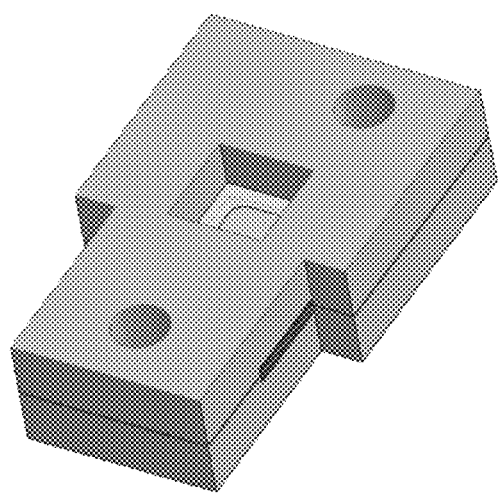

FIG. 28 is an illustration of an exemplary case for holding a discharge photoionization detector according to various aspects of the current technology.

Figure 29A:
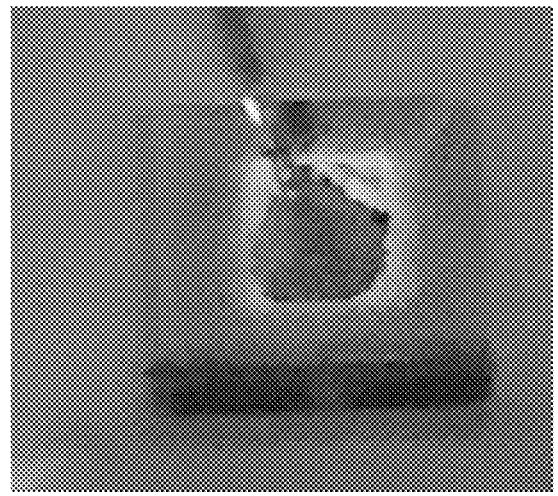

FIG. 29A is a photograph of a micro helium dielectric barrier discharge-photoionization detector (μHDBD-PID) made according to various aspects of the current technology. Here, the μHDEBD-PID is activated to generate plasma that emits ultraviolet light from helium (He).

Figure 29B:
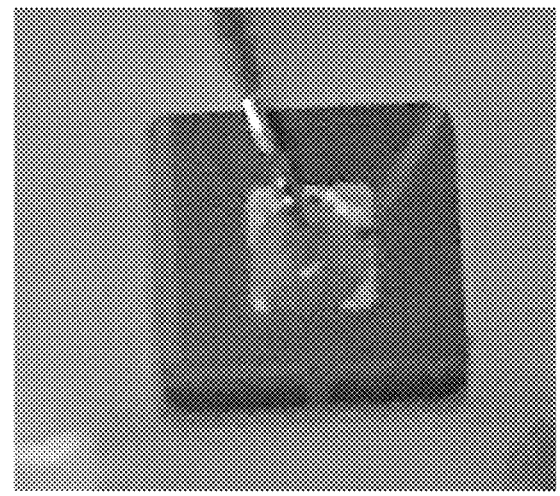

FIG. 29B is a photograph of the μHDBD-PID shown in FIG. 29A, wherein the μHDBD-PID is not activated to generate plasma.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

The current technology provides micro dielectric barrier discharge-PIDs (μDBD-PIDs) with reduced dimensions and weight relative to convention PID detectors. The μDBD-PIDs are portable and are also less power intensive, consume less gas, and have shorter warm-up times relative to conventional detectors. The μDBD-PIDs have a broad range of applications in portable and micro-gas chromatography systems for in-situ, real-time, and sensitive gas analysis.

Figure 1A:
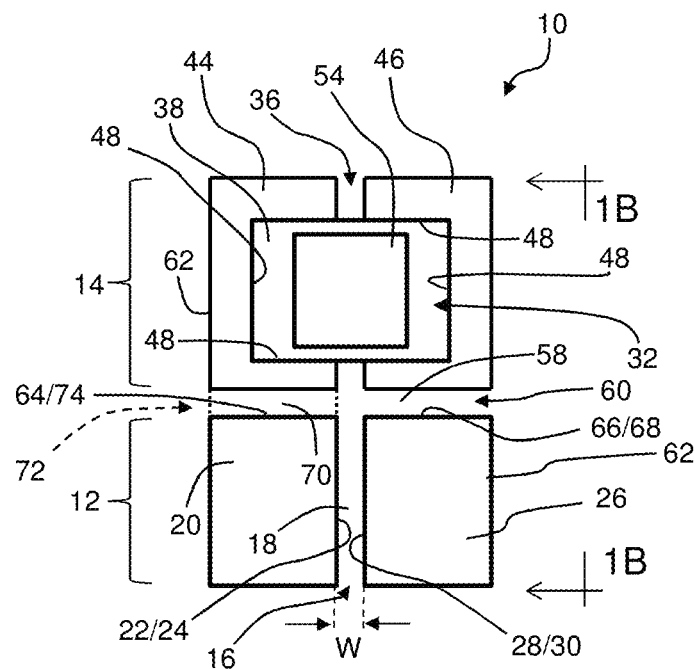
FIG. 1A is an illustration of a discharge ionization current detector made according to various aspects of the current technology.
Figure 1B:
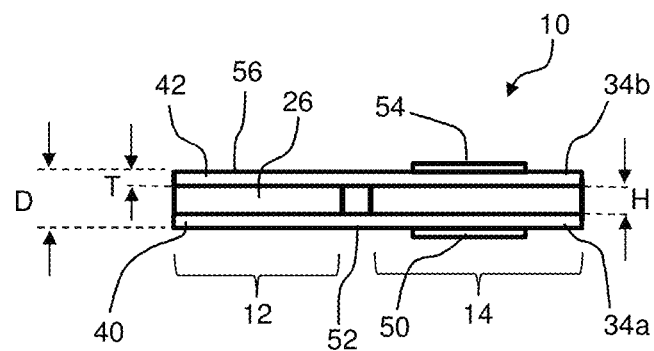
FIG. 1B is a perspective view of the discharge ionization current detector of FIG. 1A taken along line 1B.

With reference to FIGS. 1A and 1B, FIG. 1B being a perspective view of FIG. 1A along line 1B, the current technology provides a discharge ionization current detector 10, i.e., a μDBD-PID, for ionizing and detecting a sample component where a sample component is ionized using plasma created by discharge. The sample component can be, for example, a component of a sample mixture being carried or delivered by a gas, i.e., a carrier gas. In some embodiments, the sample mixture is subjected to gas chromatography, such that sample components are separated from the sample mixture and sequentially (and preferably individually) delivered through the detector 10. The detector 10 comprises an sample component detection portion 12 and a plasma generation portion 14. The sample component detection portion 12 comprises a sample component inlet 16, a microfluidic channel 18 extending from the sample component inlet 16, a first electrode 20 having a side surface 22 that defines a first side wall 24 of the microfluidic channel 18, and a second electrode 26 having a side surface 28 that defines a second side wall 30 of the microfluidic channel 18. The second side wall 30 is opposite of the first side wall 24. The first and second electrodes 20, 26 comprise a conducting or semiconducting material. Non-limiting examples of conducting materials include metals, such as, for example, copper, gold, aluminum, silver, platinum, alloys thereof, and combinations thereof, and non-limiting examples of semiconducting materials include pure (or substantially pure) or doped silicon (Si, crystalline or amorphous), silicon carbide (SiC), germanium (Ge), gallium arsenide (GaAs), gallium nitride (GaN), gallium phosphide (GaP), cadmium sulfide (CdS), lead sulfide (PbS), other group III-V semiconductors, and combinations thereof. In certain aspects of the current technology, the semiconducting material comprises a dopant, such as phosphor, germanium, boron, and combinations thereof as non-limiting examples. In various embodiments, one of the first and second electrodes (20, 26) is a bias electrode and the other of the first and second electrodes (20, 26) is a collection electrode.

The microfluidic channel 18 has a width W defined by the distance between the side surface 22 of the first electrode 20 and the side surface 28 of the second electrode 26. The width W is less than or equal to about 1 mm or greater than or equal to about 1 μm to less than or equal to about 1 mm, greater than or equal to about 50 μm to less than or equal to about 800 μm, greater than or equal to about 100 μm to less than or equal to about 600 μm, or greater than or equal to about 200 μm to less than or equal to about 400 μm.

Figure 1C:
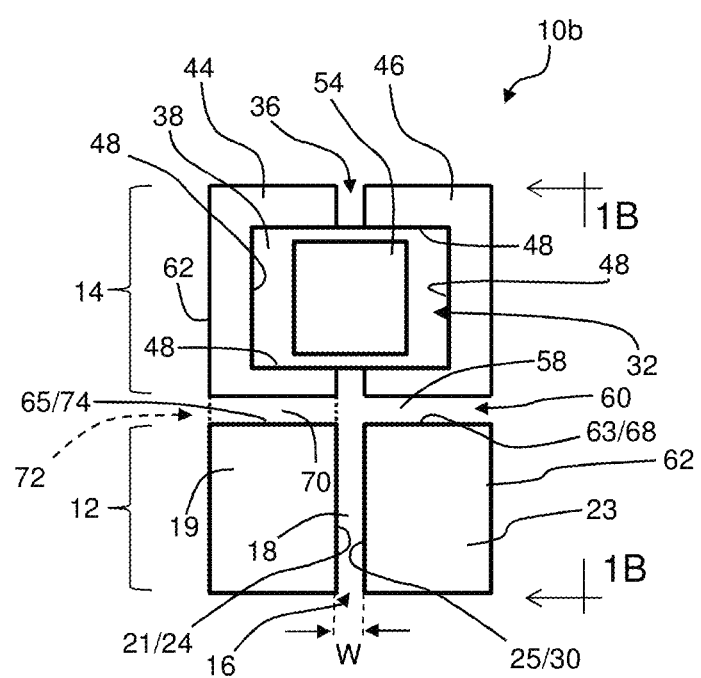
FIG. 1C is an illustration of a discharge ionization current detector made according to various aspects of the current technology.

FIG. 1C shows a μDBD-PID 10b, which is a variant of the μDBD-PID 10 shown in FIGS. 1A and 1B. Reference numerals in FIG. 1C that correspond to those in FIGS. 1A and 1B indicate corresponding parts. The detector 10b has a sample component detection portion 12 comprising a first body structure 19 having a first side surface 21 and a second body structure 23 comprising a second side surface 25. There first and second body structures 19, 23 comprise a non-conducting material. However, the first side surface 21 and the second side surface 25 are coated with a pure (or substantially pure) or doped conducting or semiconducting material, such as those described above. Here, the coated first side surface 21 and the coated second side surface 25 define the first side wall 24 and the second side wall 26 of the microfluidic channel 18. Accordingly, the detector 10 of FIGS. 1A and 1B and the detector 10b of FIG. 1C each have a microfluidic channel 18 having a first surface 21, 22 comprising a conducting or semiconducting material and an opposing second surface 25, 28 comprising a conducting or semiconducting material, one of the first surface 21, 22 and the second surface 25, 28 being a collection electrode and the other of the first surface 21, 22 and the second surface 25, 28 being a bias electrode, the microfluidic channel 18 being configured to receive a sample component.

Referring again to FIGS. 1A and 1B, the plasma generation portion 14 of the detector 10 comprises a UV light source (a photon source) comprising a plasma generation means 32 using at least one thin dielectric barrier layer 34a/b. When in use, the plasma generation means 32 interacts with a gas and generates plasma that emits ionizing light, such as ionizing UV light. The microfluidic channel 18 is in fluid communication with the UV light source such that, when activated, UV light from the UV light source can enter the microfluidic channel 18 and ionize the sample component, which releases an electron (or a plurality of electrons), and the ionized sample component and electron are detected by the collection and bias electrodes. Accordingly, it is understood that the sample component releases at least one electron when becoming ionized.

More particularly, the plasma generation portion 14 comprises a gas inlet 36, a plasma-generation void 38 partially defined between a bottom layer 40 and a top layer 42 of the detector 10 (the bottom and top surfaces 40, 42 are not shown in FIG. 1A for clarity). The gas inlet 36 is in fluid communication with the plasma-generation void 38. Although shown opposite of the sample component inlet 16 in the figure, its location is not limited and it may be located anywhere about the plasma-generation void 38 of the plasma generation portion 14. At least one of the bottom surface 40 and the top surface 42 is the thin dielectric barrier layer 34a/b, which has a thickness T of less than or equal to about 500 μm or greater than or equal to about 1 μm to less than or equal to about 500 μm, greater than or equal to about 100 μm to less than or equal to about 400 μm, greater than or equal to about 75 μm to less than or equal to about 150 μm, or greater than or equal to about 200 μm to less than or equal to about 300 μm, such as, for example, a thickness of about 10 μm, about 25 μm, about 50 μm, about 75 μm, about 100 μm, about 125 μm, about 150 μm, about 175 μm, about 200 μm, about 225 μm, about 250 μm, about 275 μm, about 300 μm, about 325 μm, about 350 μm, about 375 μm, about 400 μm, about 425 μm, about 450 μm, about 475 μm, or about 500 μm. The dielectric barrier layer 34a/b comprises either an insulating material or a poor conducting material that can be polarized by an applied electric field. Non-limiting examples of dielectric materials include ceramics, plastics, metal oxides, and glass. The bottom surface 40 is opposite of the top surface 42; accordingly, where both the bottom and top surfaces 40, 42, the detector 10 comprises a bottom dielectric barrier layer 34a and a top dielectric barrier layer 34b, the top dielectric barrier 34b being opposite the bottom dielectric barrier layer 34a. Here, the bottom and top dielectric barrier layers 34a, 34b independently have a thickness T.

The plasma-generation portion 14 also comprises a first body element 44 and a second body element 46 that have inner side walls 48, which define side walls of the plasma-generation void 38. The inner side walls 48 of the first and second body elements 44, 46 and the first and second electrodes 20, 26 have the substantially same height H, which is less than or equal to about 2 mm, or greater than or equal to about 10 μm to less than or equal to about 2 mm, greater than or equal to about 50 μm to less than or equal to about 1 mm, greater than or equal to about 100 μm to less than or equal to about 900 μm, greater than or equal to about 200 μm to less than or equal to about 800 μm, greater than or equal to about 300 μm to less than or equal to about 700 μm, greater than or equal to about 400 μm to less than or equal to about 600 μm, or greater than or equal to about 450 μm to less than or equal to about 550 μm, such as a height H of about 10 μm, about 50 μm, about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm, about 1 mm, about 1.25 mm, about 1.5 mm, 1 bout 1.75 mm, or about 2 mm. Accordingly, the first and second body elements 44, 46 (as well as the first and second electrodes 20, 26, or first and second body structures 19, 23) act as spacers that define the height H. The first and second body elements 44, 46 can comprise the same material as the first and second electrodes, 20, 26, or a substantially non-conducting material, such as plastic or glass.

The plasma-generation portion 14 further comprises a bottom plasma induction electrode 50 disposed on a bottom surface 52 of the bottom layer 40 and a top plasma induction electrode 54 disposed on a top surface 56 of the top layer 42. The bottom plasma induction electrode 50 is positioned opposite of the top plasma induction electrode 54 and the plasma-generation void 38 is located therebetween. The bottom plasma induction electrode 50 and the top plasma induction electrode 54 are separated by a distance D, which is less than or equal to about 3 mm, less than or equal to about 2 mm, less than or equal to about 1 mm, less than or equal to about 800 µm, or less than or equal to about 600 µm, such as a distance of greater than or equal to about 10 µm to less than or equal to about 3 mm, greater than or equal to about 100 µm to less than or equal to about 2 mm, greater than or equal to about 200 µm to less than or equal to about 1 mm, greater than or equal to about 300 µm to less than or equal to about 900 µm, greater than or equal to about 400 µm to less than or equal to about 800 µm, or greater than or equal to about 500 µm to less than or equal to about 700 µm, such as a distance of about 100 µm, about 200 µm, about 300 µm, about 400 µm, about 500 µm, about 600 µm, about 700 µm, about 800 µm, about 900 µm, about 1 mm, about 1.25 mm, about 1.5 mm, about 1.75 mm, or about 2 mm. The bottom and top electrodes 50, 54 comprise a conductive material, such as aluminum (Al), copper (Cu), gold (Au), silver (Ag), or platinum (Pt), as non-limiting examples.

The detector 10 also comprises a first outlet channel 58 that is in fluid communication with a first outlet 60. The first outlet channel 58 extends from the microfluidic channel 18 to the first outlet 60, which is located at an outside surface 62 of the detector 10 between the sample component detection portion 12 and the plasma generation portion 14. One of a second surface 64 of the first electrode 20 and a second surface 66 of the second electrode 26 defines a side wall 68 of the first outlet channel 58. In some embodiments, the detector 10 further comprises a second outlet channel 70 extending from the microfluidic channel 18 to a second outlet 72 at a side of the detector 62, wherein the other of the second surface 64 of the first electrode 20 or the second surface 66 of the second electrode 26 defines a side wall 74 of the second outlet channel 68. Or with reference to FIG. 1C, one of a second surface 63 of the second body structure 23 and a second surface 65 of the second body structure 19 is coated with a conducting or semiconducting material and defines the side wall 68 of the first outlet channel 58. In some embodiments, the detector 10b comprises the second outlet 72, wherein the other of the second surface 65 of first body structure 19 or the second surface 63 of the second body structure 25 defines the side wall 74 of the second outlet channel 68. Accordingly, sample component ionization and detection can occur in the outlet channels 58, 70 as well as in the microfluidic channel 18.

Referring again to FIGS. 1A and 1B, in embodiments where the detector 10 includes the first and second outlet channels 58, 70 and corresponding first and second outlets 60, 72 the first and second body elements 44, 46 of the plasma-generation portion 14 can comprise the same material as the first and second electrodes 20, 26 because the first and second body elements 44, 46 do not contact the first and second electrodes 20, 26, i.e., there are first and second outlet channels 58, 70 located between and partially defined by the first and electrodes 20, 26 and the first and second body elements 44, 46. In embodiments where the detector 10 comprises the first outlet channel 58 and the first outlet 60, there may be the second outlet channel 70 defined between the first electrode 20 and the first body element 44, but there is no second outlet 72. Rather, the side 62 of the detector extends across and blocks the second outlet channel 70. In such embodiments, the first and second body elements 44, 46 of the plasma-generation portion 14 can comprise the same material as the first and second electrodes 20, 26 because the first and second body elements 44, 46 do not contact the first and second electrodes 20, 26. In embodiments where the detector 10 comprises only the first outlet channel 58 and first outlet 60, the first body element 44 may contact the first electrode 20. In such embodiments, the first and second body elements 44, 46 of the plasma-generation portion 14 can be composed of any material because there is a gap between the first and second body elements 44, 46.

In some embodiments, such as those where the detector 10b of FIG. 1C is employed, at least one of the bottom surface 40 and the top surface 42 is coated with a pure (or substantially pure) or doped conducting or semiconducting material at a location that corresponds to a top surface of the microfluidic channel 18 and/or a bottom surface of the microfluidic channel 18. Optionally at least one of the bottom surface 40 and the top surface 42 is coated with a pure (or substantially pure) or doped conducting or semiconducting material at a location that corresponds to a top surface of the first outlet channel 58 (and second outlet channel 70 when present) and/or a bottom surface of the first outlet channel 58 (and second outlet channel 70 when present).

The microfluidic channel 18 of the sample component detection portion 12 is in fluid communication with the plasma-generation void 38 of the plasma generation portion 14. The microfluidic channel 18 delivers sample and sample components, such as analytes, and serves both as collection and bias electrodes (through the first and second side walls 24, 30) and as an ionization chamber. For example, when a gas enters the plasma-generation void 38 and the device is active, a plasma forms in the plasma-generation void 38, which emits ionization light. The gas can be, as non-limiting examples, of helium (He), Neon (Ne), Argon (Ar), Krypton (Kr), nitrogen ($N_2$), or a combination thereof. In various embodiments, the ionizing light is ultraviolet (UV) light having a wavelength of less than or equal to about 400 nm. However, in some embodiments, the ionizing light may have a wavelength in the visible (VIS) range. The ionizing light travels into the microfluidic channel 18 and contacts a sample, wherein the sample is ionized. Therefore, the microfluidic channel 18 serves as an ionization chamber. As the sample is ionized, it releases at least one electron and forms a charged molecule, which are detected at the collection electrode.

Figure 2:
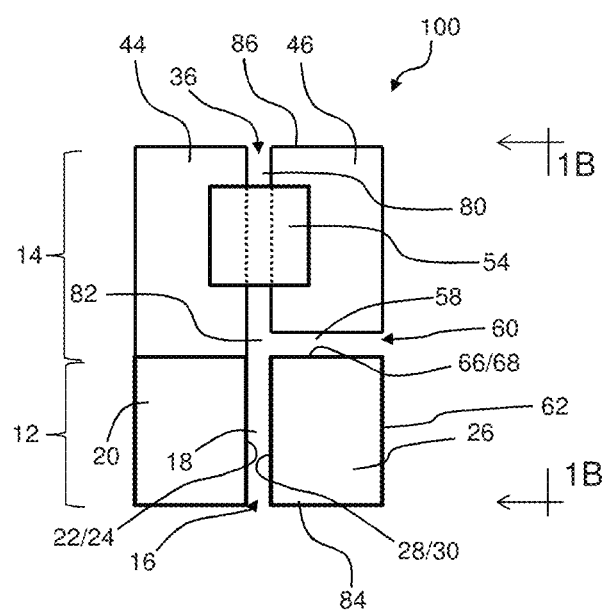
FIG. 2 is an illustration of a discharge ionization current detector made according to various aspects of the current technology.

As described above, plasma is generated in the plasma-generation void 38. In some embodiments, the plasma-generation void 38 is a plasma generation channel. FIG. 2 shows a perspective view of a discharge ionization current detector (µDBD-PID) 100, which is similar to the detector 10 of FIG. 1A. Overlapping features between the detectors are given the same reference numeral. The detector 100 of FIG. 2 comprises the gas inlet 36, which is in fluid communication with a plasma-generation channel 80. Here, the microfluidic channel 18 extends from the sample component inlet at a first end 84, the plasma-generation channel 80 extends from the gas inlet 36 at an opposing second end 86, and the microfluidic channel 18 and the plasma-generation channel 80 merge together and define a substantially linear channel 82. Accordingly, the plasma-generation channel 80 has substantially the same dimensions (width W, height H, etc.) as the microfluidic channel 18, and is in line with the microfluidic channel 18. However, it is understood that the plasma-generation channel 80 may have different dimensions (width W, height H, etc.) as the microfluidic channel 18, such as to, for example, accommodate a larger or smaller input of plasma-generating gas.

The first outlet channel 58 extends from the substantially linear channel 82 to the end 62, which is adjacent to the first end and the second end. In various embodiments, the outlet channel 58 is substantially orthogonal to the substantially linear channel 82. Here, the second surface 66 of the second electrode 26 defines the side wall 68 of the second outlet channel 68. It is understood that in some embodiments, the detector 100 includes a second outlet channel associated with a second outlet as described above in regard to FIG. 1A.

The bottom and top discharge electrodes 50, 54 are positioned opposite of each other with the plasma-generation channel 80 therebetween. Therefore, when gas enters the plasma-generation channel 80 via the gas inlet 36, and the discharge electrodes 50, 54 are activated, plasma is generated in the plasma-generation channel 80 that emits ionizing light.

In FIG. 2, the first electrode 20 is in contact with the first body element 44. Therefore, the first body element 44 and the first electrode 20 are electrically insulated. In some embodiments, the first electrode 20 is a bias electrode and the second electrode 26 is a collection electrode.

Figure 3:
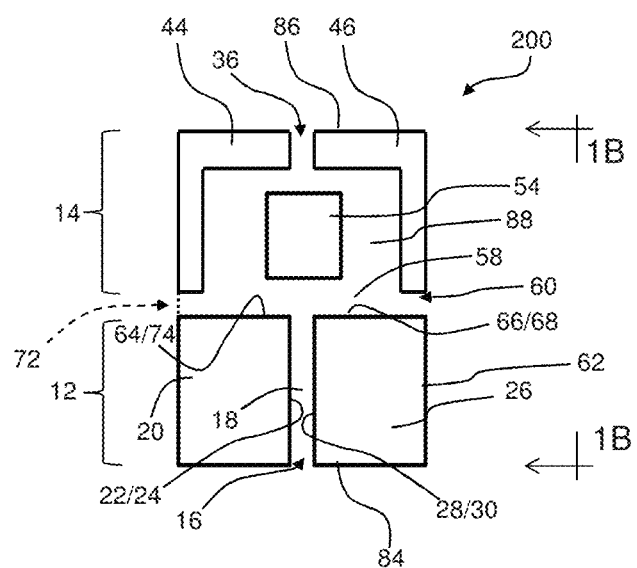
FIG. 3 is an illustration of a discharge ionization current detector made according to various aspects of the current technology.

In various embodiments, the plasma-generation void 38 shown in FIG. 1A is a plasma-generation chamber. FIG. 3 shows a perspective view of a discharge ionization current detector (μDBD-PID) 200, which is similar to the detector 10 of FIG. 1A. FIG. 1B is a side view of the detector 200 taken along line 1B. Overlapping features between the detectors are given the same reference numeral. The detector 100 of FIG. 2 comprises the gas inlet 36, which is in fluid communication with a plasma-generation chamber 88. The plasma-generation chamber 88 has a volume of greater than or equal to about 1 mm$^3$ to less than or equal to about 20 mm$^3$, greater than or equal to about 2 mm$^3$ to less than or equal to about 15 mm$^3$, greater than or equal to about 5 mm$^3$ to less than or equal to about 10 mm$^3$, or greater than or equal to about 6 mm$^3$ to less than or equal to about 8 mm$^3$. Accordingly, the plasma-generation chamber 88 holds a fluid volume of greater than or equal to about 1 μL to less than or equal to about 20 μL, greater than or equal to about 2 μL to less than or equal to about 15 μL, greater than or equal to about 5 μL to less than or equal to about 10 μL, or greater than or equal to about 6 μL to less than or equal to about 8 μL.

The first outlet channel 58 extends from the first outlet 60 to an opposing wall 62. In some embodiments, the first outlet channel 58 extends from the first outlet 60 to the second outlet 72. Here, the second surface 66 of the second electrode 26 defines the side wall 68 of the second outlet channel 68 at a first region of the outlet channel 68 and the second surface 64 of the first electrode 20 defines the side wall 74 at a second region.

The bottom and top discharge electrodes 50, 54 are positioned opposite of each other with the plasma-generation chamber 88 therebetween. Therefore, when gas enters the plasma-generation chamber 88 via the gas inlet 36, and the discharge electrodes 50, 54 are activated, plasma is generated in the plasma-generation chamber 88 that emits ionizing light.

Figure 4A:
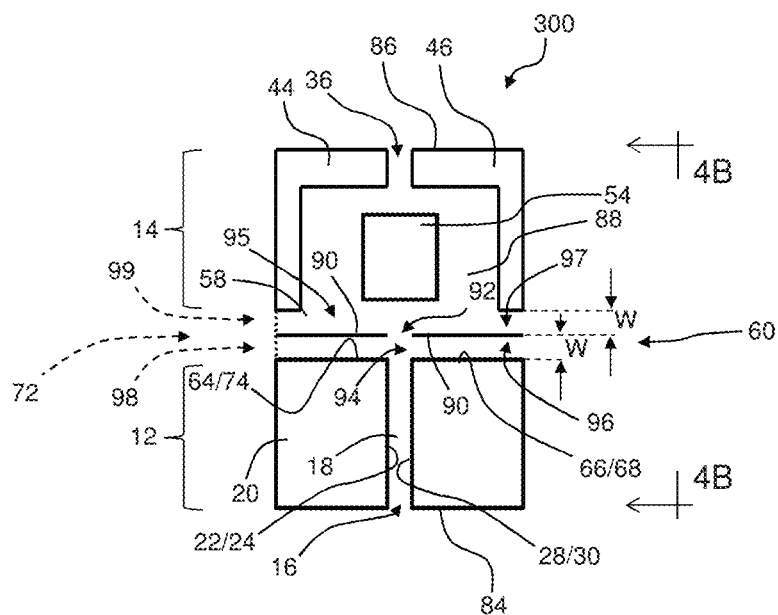
FIG. 4A is an illustration of a discharge ionization current detector made according to various aspects of the current technology.
Figure 4B:
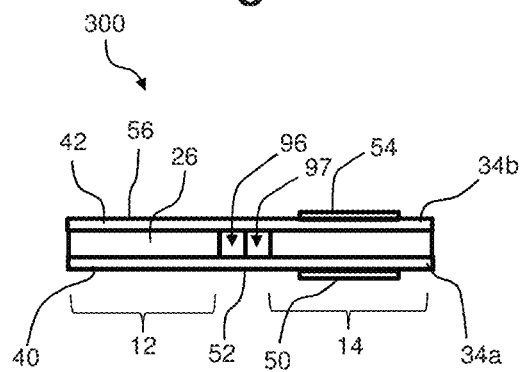
FIG. 4B is a perspective view of the discharge ionization current detector of FIG. 4A taken along line 4B.
Figures 5A, 5B, 5C, 5D:
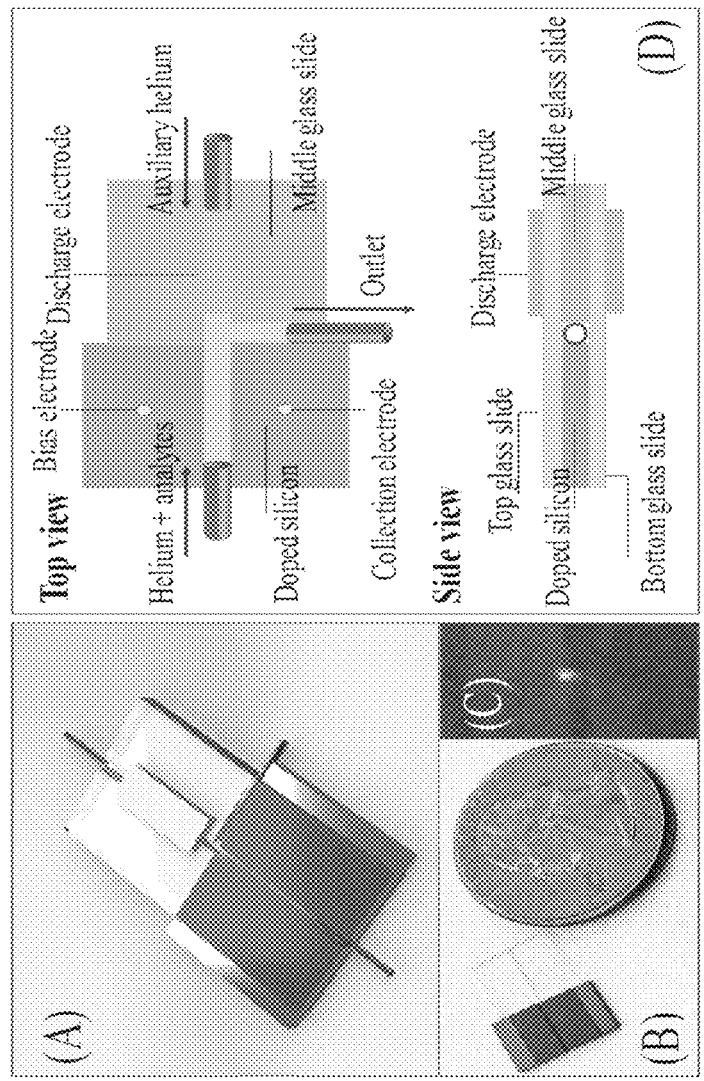
FIG. 5A is a 3-dimensional rendering of a micro-helium discharge photoionization detector (μHDBD-PID).
FIG. 5B is a picture of a μHDBD-PID (without the discharge electrodes) and plasma generated by a μHDBD-PID.
FIG. 5C illustrates plasma generated by a μHDBD-PID (most part of plasma was blocked by the electrode).
FIG. 5D illustrates the detailed structure of a μHDBD-PID.
Figure 6:
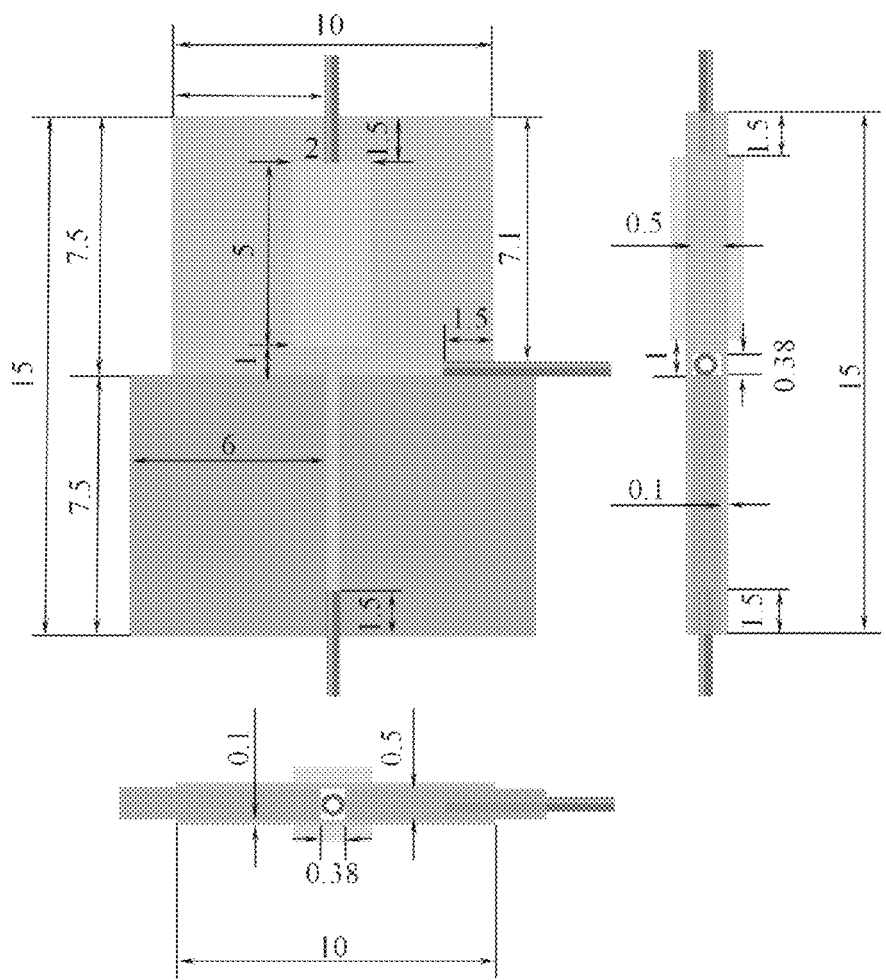
FIG. 6 is a 3-view diagram of the μHDBD-PID. Units: mm.

FIG. 4A shows a perspective view of a detector 300 and FIG. 4B is a side view of the detector 300 taken along line 4B. The detector 300 is similar to the detector 200 of FIG. 3. However, in the detector 300, the outlet channel 58 and the first outlet 60 (and the second outlet 72 when present) are longitudinally bifurcated by a wall 90. The wall 90 comprises a conducting or semiconducting material and has an aperture 92, such that the plasma-generation chamber 88 is in fluid communication with the microfluidic channel 18. However, the aperture blocks, prevents, or inhibits electric arc or plasma from entering or occurring in the sample component detection portion 12, but selectively permits UV light to pass into the sample component detection portion 12, where the UV light ionizes sample components. This helps reduce background and noise, and improves detector stability. The location of the aperture 92 in the wall 90 is not limited so long as ionizing light can pass through the aperture 92 from the plasma generation chamber 88 and into the microfluidic channel 18 and optionally into the first outlet channel 94, where ionization of sample components can also occur. The bifurcated outlet channel 58 has a first outlet channel section 94 associated with the microfluidic channel 18 and a second outlet channel section 95 associated with the plasma-generation chamber 88, and the bifurcated first outlet 60 has a first outlet section 96 associated with the first outlet channel section 94 and a second outlet section 97 associated with the second outlet channel section 95. Similarly, when the second outlet 72 is present, the second outlet 72 is bifurcated into a third outlet section 98 that is associated with the first outlet channel section 94 and a fourth outlet section 99 that is associated with the second outlet channel section 95. Each of the outlet channel sections 94, 95 and the outlet channel sections 96, 97, 98, 99, have a width W as described above.

During use, a plasma is generated in the plasma-generation chamber 88. The plasma emits light that passes through the aperture 92 in the wall 90, which ionizes a sample component in the microfluidic channel 18. The sample component is ionized and release at least one electron, which is detected by one of the first or second electrode 20, 26. Although a small fraction may exit through the second outlet section 97 and/or the fourth outlet section 99, a majority of the sample component exits the detector 300 through the first outlet section 96 (and the third outlet section 98 when present) by way of the first outlet channel section 94. Similar, although a small fraction may exit through the first and third outlet sections 96, 98, a majority of the products generated in the plasma-generation chamber 88 exit through the second outlet channel section 97 (and the fourth outlet section 99 when present) by way of the second outlet channel section 95.

The detectors 10, 100, 200, 300 of FIGS. 1A-4B can be fabricated by piecing components together onto a substrate or by photolithography. For example, the detector 100 of FIG. 2 can be made by disposing electrodes onto a substrate (which may be a dielectric barrier layer) to form a sample component detection portion and glass elements can be disposed on the substrate to form a plasma generation portion. As another example, the detector 300 of FIGS. 4A and 4B can be made by disposing a semiconducting material onto a substrate (which may be a dielectric barrier layer) and carving patterns into the substrate by photolithography, wherein the patterns correspond to a sample component detection portion and a plasma generation portion. Gaps about the guard columns can be filled with an adhesive, a gel, or a putty.

The current technology further provides a method of detecting a sample component. In various embodiments, the sample component was separated from a sample mixture by GC. The method can be performed using any of the devices described herein. The method comprises generating plasma that emits ionizing light in a plasma-generation void defined between a bottom dielectric barrier layer and a top dielectric barrier layer, the bottom dielectric barrier layer and the top dielectric barrier layer independently have a thickness of greater than or equal to about 1 μm to less than or equal to about 500 nm; applying a bias voltage across a microfluidic channel disposed between a first electrode that defines a first wall of the microfluidic channel and a second electrode that defines a second wall of the microfluidic channel, the second wall being opposite to the first wall at a distance of less than or equal to about 1 μm to less than or equal to about 1 mm; delivering a sample component through the microfluidic channel, wherein the ionizing light contacts the sample component and ionizes the sample component to generate a sample component cation and a free electron; and detecting the sample component cation and the electron at the first and second electrodes. In various embodiments, the plasma is generated from a gas selected from the group consisting of helium (He), Neon (Ne), Argon (Ar), Krypton (Kr), nitrogen ($N_2$), and a combinations thereof and at a voltage of less than or equal to about 5 kV.

Embodiments of the present technology are further illustrated through the following non-limiting examples.

Example 1

H, a micro-helium dielectric barrier photoionization detector (μHDBD-PID) on chip is presented with dimensions of only ~15 mm×~10 mm×~0.7 mm and weight of only ~0.25 g. It offers low power consumption (<400 mW), low helium consumption (5.8 mL/min), rapid response (as good as FID), quick warm-up time (~5 min), an excellent detection limit (a few pg), a large linear dynamic range (>4 orders of magnitude), and maintenance-free operation. Furthermore, the μHDBD-PID can be driven with a miniaturized (~5 cm×~2.5 cm×~2.5 cm), light (22 g), and low cost (~$2) power supply with only 1.5 VDC input. Here we report the design, fabrication, and characterization of the above μHDBD-PID and demonstrate its GC applications. A detailed comparison of our μHDBD-PID with other HD-PIDs is summarized in Table 1.

TABLE 1

Comparison of the current μHDBD-PID with other HD-PIDs

|  | Mesoscale Pulsed HDBD-PID[1] | VICI PD-D2-IM | Shimadzu BID | Integrated μDPID[2-4] | μHDBD-PID (our work) |
| --- | --- | --- | --- | --- | --- |
| Discharge mechanism | Pulsed discharge | Pulsed discharge | Dielectric barrier discharge | DC discharge | Dielectric barrier discharge |
| Minimum or typical auxiliary helium flow rate (mL/min) | 35 | 10 | 50-100 | 1 | 5.8 |
| Detection limit | A few pg | Low to sub-pg | Low to sub-pg | 10 pg | A few pg |
| Dimensions | 10 mL | ~400 mL | As big as a commercial FID | On-chip scale | On-chip scale (0.1 mL) |
| Power consumption | Unknown | Unknown | Unknown | 1.4 mW (without including power consumption of power supply) | 385 mW (all-inclusive) ~3 mW on HDBD-PID itself. Heating needs extra power |
| Type of chemicals | Universal | Universal | Universal | Universal | Universal |
| Electrodes destruction | Yes | Yes | No | Yes | No |
| Warm-up time | Unknown | A few minutes | A few hours | Unknown | <5 min |
| Comments | Pros: Sensitive and small in footprint Cons: High helium consumption and electrode maintenance | Pros: Very sensitive, quick warm up, and affordable helium consumption, Cons: Bulky, electrode maintenance | Pros: Very sensitive and maintenance free Cons: High helium consumption, lengthy warm up time and bulky in size | Pros: Sensitive, tiny footprint, and very low helium consumption Cons: Electrode maintenance and unexpected negative signal, external high voltage generator needed | Pros: Sensitive, tiny footprint, quick warm up time, complete miniaturized system Cons: Relatively high helium consumption compared to Integrated mDPID |

Device Fabrication and Assembly

All the silicon and glass wafers were purchased from University Wafer Company (Boston, Mass.). As shown in FIG. 1 and S1, a 100 μm thick Borofloat® 33 glass wafer (P/N 1737) was diced into 15 mm×10 mm rectangular pieces and used as the top and bottom substrates. A 500 μm thick P-type <100> silicon wafer with double-side-polished 500 nm thick thermal oxide layers (P/N 2078) was diced into a 7.5 mm×6 mm rectangular shape, followed by wet etching using 49% buffered HF to remove the oxide layer. As illustrated in FIGS. 5A-5D and FIG. 6, two pieces of such prepared silicon wafers were then bonded onto the bottom glass substrate using UV-curable optical glue (Norland® 81). The gap between the two silicon wafers was 380 μm to create a fluidic channel for analytes and carrier gas (i.e., helium). Meanwhile, the two silicon wafers also acted as the bias and the collection electrodes. 500 μm thick Borofloat® 33 glass wafer (P/N 517) was diced into two rectangular pieces (7.5 mm×4.8 mm and 7.1 mm×4.8 mm) and then bonded using the same UV-curable glue onto the bottom glass substrate with a 380 μm gap between each other to create a fluidic channel for auxiliary helium. Another gap of 380 μm was also created between the silicon wafer and the glass wafer to form the third fluidic channel as the outlet. Finally, the top glass substrate was bonded onto the middle silicon and glass pieces using the same UV-curable optical glue. After assembly, three guard columns with 380 μm OD and 250 μm ID were inserted into the two inlets and the outlet of fluidic channels and sealed with the optical glue.

To excite helium plasma, a low-cost miniaturized high-voltage high-frequency power supply was developed in-house based on a flyback transformer circuit (shown in FIG. 7A). It has the dimension of ~5 cm×~2.5 cm×~2.5 cm (FIG. 7B) and weighs about 22 g. With a 1.5 VDC input (257 mA), it outputs 4 kV at 7.7 kHz. The high voltage output and the ground of the power supply were connected to the top and the bottom glass substrates, respectively, via two pieces of copper tapes (dimension: 5 mm×2 mm. See FIGS. 1(D) and 6 for illustration).

To generate signal, a variable DC bias voltage (nominal voltage: 40 VDC) was applied between the collection and the bias electrodes (FIG. 8). The current signal was converted to the voltage signal and amplified by an amplifier (Stanford Research Systems SR560, input impedance=100 MΩ+25 pF) with a gain factor of 5 and low pass cutoff frequency of 1 Hz. The final voltage signal was recorded through a LabVIEW™ program via a DAQ card (NI USB-6210, National Instruments, Austin, Tex.) with the digital low pass cutoff frequency of 25 Hz and the data acquisition rate of 14.5 Hz. The μHDBD-PID was operated at 20° C. unless otherwise specified.

Experimental

Methanol (P/N 322415), Pentane (P/N 236705), Carbon tetrachloride (P/N 289116), Heptane (P/N 246654), Benzene (P/N 270709), Toluene (P/N 244511), Ethylbenzene (P/N 03079), p-Xylene (P/N 317195), n-Nonane (P/N 296821), EPA 8260 VOC mix (P/N 500607), Aliphatics mix (C5-C12) (P/N UST157), and Mol Sieve 5A PLOT (P/N 2423) column for permanent gas separation were all purchased from Sigma-Aldrich (St. Louis, Mo.) and used without further purification or treatment. Ultrapure helium (99.999%) used as auxiliary gas and carrier gas in all experiments was purchased from Cryogenic Gases (Ann Arbor, Mich.). GC guard column (Catalog #10059), separation column Rtx®-VMS (Catalog #19915) and Rtx®-1 (Catalog #10105) were purchased from Restek Corp. (Bellefonte, Pa.).

The experimental setup is illustrated in FIG. 9. All the analytes were injected from the 1177 injector equipped on Varian 3800 GC with a split ratio of 100. A 1 m long guard column was used to connect the separation column and the μHDBD-PID, unless otherwise specified. The outlet of the μHDBD-PID was connected to atmosphere. Only during the non-destruction verification was the outlet of the μHDBD-PID connected to a commercial FID equipped on Varian 3800 GC via a short guard column. The auxiliary and carrier gas flow rate was measured at the inlet of auxiliary channel and analyte channel, respectively, with an Ellutia-6000 GC flowmeter.

Results and Discussion

Low Voltage and Low Power Operation

The breakdown voltage is propositional to the dietetic layer thickness and the gap between the excitation electrodes. In our design, the dielectric barrier is only 100 μm thick and the electrodes are only 380 μm apart, which enable the onset of helium plasma at a relatively low voltage (i.e., 4 kV) and the entire operation power as low as 385±3 mW (Agilent E3649A, 1.5 VDC at 257 mA). Note that the above power consumption was measured at the "no-load test" (i.e., open circuit test). The actual power consumption on the μHDBD-PID by examining the difference between the open and closed circuits is approximately 3 mW, which is on the same order of magnitude as the power dissipation calculated in the next section ("Warm-up time"). It is noted that the μHDBD-PID was designed to operate at room temperature and the power specified above was mainly for the helium discharge circuit. Extra power is needed if operation at elevated temperature is desired.

Warm-Up Time

The low AC voltage and low power consumption also translate to a shorter warm-up time. The helium discharge efficiency depends on a number of factors, such as electrode gap, dielectric barrier thickness, temperature, AC frequency, and voltage, etc. . . . . With all other factors fixed, the temperature becomes a dominant factor in determining the plasma fluctuation. The longer it takes for the device's temperature to stabilize, the longer the warm-up time.

The excitation electrode geometry in our setup can be modeled as a capacitor. Power dissipation occurs when AC voltage is applied, which can be calculated as:

$$P = V^2 \omega C(DF),$$

where P is the dissipated power. V and ω are the applied AC voltage and angular frequency, respectively. C is the capacitance and DF is the dissipation factor. At equilibrium, the dissipated power manifests itself as the increase in the device temperature. Using V=4000 V, ω=2×π×7700, C=0.9 pf, and DF=0.003, the dissipated power is calculated to be as low as 2 mW, resulting in a very small increase in device temperature and hence quick temperature stabilization. In fact, the temperature of the μHDBD-PID during operation was measured to be 20.7° C. with Southwire™ 31030 s non-contact IR thermometer, only 0.4° C. above the ambient temperature. Consequently, as shown in FIG. 10, the μHDBD-PID can be stabilized within only 5 minutes.

Bias Voltage Optimization

Following photoionization, the ions of analytes are compelled by the electric field between the two electrodes and reach the electrodes. Strong electric field can reduce the ion flux traveling time and increase the ion collection efficiency by preventing ion recombination and quenching. However, excessive electric field not only increases the noise without proportionately increasing the signal, but also adds costs. In order to optimize the bias voltage for the μHDBD-PID, we used 2.356 ng of heptane as a model system. As shown in FIG. 11, initially the peak height and the signal-to-noise ratio (SNR) increase when the bias voltage is in the range of 10 V to 30 V, and level off when the bias voltage is beyond 40 V. Therefore, in the following experiments, the bias voltage was set at 40 V, which is the minimum bias voltage to generate the maximal ion collection efficiency and SNR.

Flow Dependence

The intensity of plasma's deep UV emission shows a positive correlation with the auxiliary helium flow rate. Consequently, the peak height (i.e., signal) increases with the increased auxiliary helium flow rate, as shown in FIG. 12A. However, at an excessive auxiliary helium flow rate, plasma jet occurs, accompanied by a drastic increase in the noise level. Consequently, the SNR has a bell shape with the maximum achieved at about 16 mL/min (measured at the auxiliary flow inlet with corresponding gas source pressure: 3 psi). In the experiments that followed, we used an auxiliary helium rate of 5.8 mL/min (measured at the auxiliary flow inlet with the corresponding gas source pressure of 1 psi) in order to reduce helium consumption (but at the expense of the SNR, which is reduced by 30-40% from its maximum).

At a fixed auxiliary helium inlet pressure (1 psi in our case), changing the carrier gas flow rate also affects the performance of the μHDBD-PID, as the absolute auxiliary helium flow rate decreases when the carrier gas flow increases. Thus, with the increased carrier gas flow rate, a slight decrease in the analyte peak area can be observed (see FIG. 12B) due to the decreased plasma emission, as discussed previously. Besides the peak area, the peak height is also affected by the carrier gas flow rate, as shown in FIG. 12B. At a low carrier gas flow rate (e.g., 0.5 mL/min), the peak height for a given quantity of analyte is low due to peak broadening resulting from long elution time. On the other hand, at a very high carrier gas flow rate (e.g., 3.6 mL/min), the decrease in the auxiliary helium flow rate becomes a dominant effect. Consequently, although the peak is sharper at a high carrier gas flow rate (see FIG. 13), the peak height still decreases due to the decrease in plasma emission. For the current μHDBD-PID, the maximal peak height was achieved with the carrier flow rate of 1-2 mL/min (FIG. 12B).

Overall, FIGS. 12A and 12B show the interplay of the auxiliary helium flow rate and the carrier gas flow rate on the analyte peak and peak area. Since the auxiliary flow rate is usually adjusted by tuning the gas source pressure, the absolute auxiliary flow rate is affected by the carrier gas flow rate (at a given auxiliary gas source pressure). As a result, GC separation based on pressure ramping method cannot be employed if an HDBD-PID is used for quantitative analysis, unless the same auxiliary flow rate can be maintained independently of the carrier gas flow rate during the pressure ramping.

Temperature Effect

Through the previous studies, it is known that temperature affects the helium discharge performance. Here we investigated the effect of temperature on the overall μHDBD-PID performance. The μHDBD-PID was heated by a thermoelectric Peltier plate (P/N CP30138 purchased from Digi-Key) from 20° C. to 80° C. (maximum operation temperature of the plate) for four cycles. The results shown in FIG. 14 are highly repeatable in multi-cycle heating processes, attesting to the thermal robustness of the μHDBD-PID. As the temperature increases from 20° C. to 80° C., the peak height of 2.356 ng heptane increases 2.5 times, whereas the noise level increases slightly higher than that, resulting in a 5% decrease in the SNR. In practice, to obtain a reliable performance, the temperature of the μHDBD-PID should be kept constant and the thermal crosstalk between the separation column and the μHDBD-PID should be avoided when the temperature ramping method is used in GC separation.

Response Time

Owing to the flow-through design, μHDBD-PID has a rapid response to analytes. A comparison between the μHDBD-PID and a commercial FID was shown in FIG. 15A, showing virtually identical peak width. In fact, the internal chamber volume was only 1.4 μL, corresponding to an ultimate peak width as sharp as 56 ms (calculated from the gas swept time with a 1.5 mL/min flow rate). The dead volume of the μHDBD-PID is estimated to be only 6 nL from the COMSOL simulation shown in FIG. 15B, thus the tailing effect can be negligible. We further characterized the response time of the μHDBD-PID in FIG. 16A using VOCs with lower volatilities ($C_8$-$C_{12}$, vapor pressure at 25° C.: ~1500 Pa-18 Pa). In this case, the μHDBD-PID was placed outside the GC oven and at room temperature, and connected to a 7 m long separation column (Rtx®-VMS) via a 1 m long guard column, whereas the commercial FID was directly connected to the above separation column (Rtx®-VMS) and heated to 300° C. The comparison results are given in FIG. 16B, showing no difference in the peak width for $C_8$-$C_{12}$. Therefore, our μHDBD-PID can be safely used at room temperature to analyze VOCs with volatility higher than $C_{12}$ (vapor pressure=18 Pa at 25° C.), which helps save the energy for detector heating. Later, we will show that our μHDBD-PID is able to detect VOCs with even lower vapor pressure without the condensation effect (see the Section "Application to GC separation").

Linearity

In order to perform an accurate quantitative analysis, linear response to analyte is highly desirable. Here, the peak height response curves of 8 representative analytes with injection masses in a range from a few tens of pg to a few tens of ng (limited by the sample capacity of the separation column, which is a couple of hundred ng) is shown in FIGS. 17A and 17B, showing an excellent linearity (see Table 2 for the linear regression parameters). Considering the detection limit of only a few pg for the above analytes (see next section) a linear dynamic range of >4 orders of magnitude can be obtained.

TABLE 2

| Regression parameters | | | |
|---|---|---|---|
| | Slope | Adjusted R | P-value |
| Pentane | 0.1191 | 0.9998 | 7.81E-04 |
| Carbon tetrachloride | 0.1017 | 0.9978 | 2.15E-03 |
| Heptane | 0.1317 | 0.9999 | 3.96E-04 |
| Benzene | 0.1681 | 0.9997 | 1.31E-03 |
| Toluene | 0.1321 | 0.9992 | 1.64E-03 |
| Ethylbenzene | 0.1698 | 0.9992 | 2.21E-03 |
| p-Xylene | 0.1068 | 0.9999 | 3.35E-04 |
| Nonane | 0.1189 | 0.9993 | 1.45E-03 |

Detection Limit

FIG. 18 is a plot of peak height divided by injection mass as a function of logarithm of injection mass for eight VOCs shown in FIGS. 17A and 17B. The detection limit was calculated at 3 standard deviations based on result of minimum injection mass in the above linearity tests (see FIG. 19). The detection limits and physical properties of the 8 VOCs are given shown in Table 3.

TABLE 3

Detection limits parameters and physical properties of 8 VOCs

| VOC | DL[a] | IP[b] | PH[c] | SD[d] |
|---|---|---|---|---|
| Pentane | 4.6 | 10.35 | 1.81 | 0.3 |
| CCl4 | 5.3 | 11.47 | 3.95 | 0.25 |
| Heptane | 4.2 | 10.08 | 2.19 | 0.21 |
| Benzene | 3.2 | 9.25 | 3.64 | 0.04 |
| Toluene | 4.0 | 8.82 | 2.85 | 0.04 |
| Ethylbenzene | 3.1 | 8.76 | 3.71 | 0.03 |
| p-Xylene | 5.1 | 8.56 | 2.26 | 0.04 |
| n-Nonane | 4.5 | 9.72 | 2.13 | 0.04 |

[a]Detection limit at 3σ (pg), σ = 0.18 mV.
[b]Ionization potential (eV).
[c]Peak height (mV).
[d]Standard deviation of peak height (mV) obtained with 4 measurements.

Here it is worth discussing the design in our µHDBD-PID that helps improve the detection limit. First, the analyte channel and helium discharge channel in the µHDBD-PID are fluidically separated (see FIG. 15B), which prevents the analyte dilution caused by the incoming auxiliary flow. Second, the electrodes of the µHDBD-PID are composed of the entire sidewall of the p-type silicon wafers. Such a long electrode (6 mm) along the UV illumination pathway facilitates the low detection limit. Similarly, in a recent studies, multiple collection electrodes were used to improve the sensitivity. Third, the small gap of only 380 µm between the two electrodes ensures efficient collection of ions and electrons generated by photoionization.

Application to GC Separation

In FIGS. 20 and 21, the overall performance of the µHDBD-PID was tested by detecting permanent gases and EPA 8260 standard reagent, respectively. The mixture of the permanent gases (hydrogen, nitrogen, and oxygen) was prepared in a Tedlar® bag and separated with a PLOT column. Even though the ionization potential of nitrogen is as high as 15.58 eV, it can still be ionized and detected by the µHDBD-PID, which substantiates the universal applicability of our detector. There are 51 VOCs in a sub-list of the EPA 8260 standard reagents. FIG. 21 shows the comparison between FID (heated to 300° C.) and µHDBD-PID (operated at room temperature), with 47 peaks being fully separated and detected by both detectors (see also FIGS. 22 and 23 for some of the exemplary peaks and Table 4 for the names of the 51 VOCs). Except for the 4 co-eluents, all the separated eluents exhibit the symmetric peak shape and comparable peak width for both detectors. Particularly, FIG. 23 shows the last two analytes (naphthalene and 1,2,3-trichlorobenzene) in the chromatogram, which are actually #96 and #97 analyte in the EPA 8260 list and have a vapor pressure of 11.3 Pa and 28 Pa, respectively, at 25° C. Comparison between the two detectors shows no difference in their respective peak widths, suggesting that the µHDBD-PID is able to handle the VOCs with the vapor pressure as low as 10 Pa and up to naphthalene and 1,2,3-trichlorobenzene in the EPA 8260 list without the condensation issue.

TABLE 4

51 VOCs 1. 1,1-Dichloroethylene
2. Dichloromethane
3. trans-1,2-Dichloroethylene
4. 1,1-Dichloroethane
5. cis-1,2-Dichloroethylene
6. 2,2-Dichloropropane
7. Bromochloromethane
8. Chloroform
9. Carbon tetrachloride
10. 1,1,1-Trichloroethane
11. 1,1-Dichloro-1-propene
12. Benzene
13. 1,2-Dichloroethane
14. Trichloroethylene
15. Dibromomethane
16. 1,2-Dichloropropane
17. Bromodichloromethane
18. Toluene
19. Tetrachloroethylene
20. 1,1,2-Trichloroethane
21. Dibromochloromethane
22. 1,3-Dichloropropane
23. 1,2-Dibromoethane
24. Chlorobenzene
25. Ethylbenzene
26. 1,1,1,2-Tetrachloroethane
27. m-Xylene
28. p-Xylene
29. o-Xylene
30. Styrene
31. Bromoform
32. Bromobenzene
33. Propylbenzene
34. 1,1,2,2-Tetrachloroethane
35. 2-Chlorotoluene
36. Mesitylene
37. 1,2,3-Trichloropropane
38. 4-Chlorotoluene
39. tert-Butylbenzene
40. 1,2,4-Trimethylbenzene
41. sec-Butylbenzene
42. Isopropyl toluene
43. 1,3-Dichlorobenzene
44. 1,4-Dichlorobenzene
45. Butylbenzene
46. 1,2-Dichlorobenzene
47. 1,2-Dibromo-3-chloropropane
48. Hexachloro-1,3-butadiene
49. 1,2,4-Trichlorobenzene
50. Naphthalene
51. 1,2,3-Trichlorobenzene Non-destructive evaluation and long-term operation evaluation We tested the non-destructive nature of the µHDBD-PID in FIG. 24, in which the FID was connected to the µHDBD-PID via a 40 cm guard column. The peak height of the FID was compared by turning the µHDBD-PID plasma "ON" and "OFF", and found to be same with a t-test. Finally, the µHDBD-PID exhibited excellent robustness. No single failure was observed during 3-week long operation.

The present invention is a novel µHDBD-PID that exhibits superior characteristics and performance in size, weight, ease of fabrication, cost, power consumption, detection limit, dynamic range, response time, and detector lifetime. It can be broadly used in portable and micro-GC systems for in-situ, real time, and sensitive gas analysis. FIG. 25 shows the µHDBD-PID, including an ionization reaction in a microfluidic channel and resulting peak separation.

For additional description relating to the present teachings, attention should be directed to Exhibit A, which is hereby incorporated and made a part of the present application.

Example 2

A detector is now fabricated. Designs for the detector are shown in FIGS. 26A and 26B. In this design, a volume of a plasma chamber is increased. Therefore, discharged gas ions are not likely to be delivered into an electron collection channel. An additional silicon wall is designed between a discharge area and a signal collection area, which serves as an ion and arc shutter to reduce baseline and prevent signal overshoot.

Materials

A P type, double side polished, 380 μm thick silicon waver is used. Double side polished BOROFLOAT® 33 borosilicate glass is also used.

Fabrication Procedure

Anodic Bonding.

Silicon and glass wafers are cleaned with piranha for 10 minutes at 65° C. The silicon and glass wafers are quick dump rinsed (QDR) and spinner rinse dried (SRD). The silicon and glass wafers are baked at 180° C. for 2 minutes. Then anodic bonding is run with SU-6E bonding at 350° C. and 1300 V voltage. FIG. 27A shows the silicon wafer disposed on the glass wafer.

Flow Channel Etching.

$O_2$ plasma cleaning is run with 800 W power, 360 sec, 80 sccm $O_2$, at 150° C. A 4 μm thick SPR 220 3.0 is spun at Karl suss ACS 200 cluster soft bake at 115° C. for 90 seconds. Karl suss MA-BA mask aligning system is exposed for 10 seconds. Post baking is performed at 115° C. for 90 seconds. Developing is performed with mikcorposit MF 300 developer for 45 seconds. One silicon carrier wafer is mounted with Santovac 5 and etched on STS Pegasus 4 for 140 cycles with back cuck temperature of 10° C. for through wafer etching. FIG. 27B shows the etched silicon wafer.

Glue Bonding.

Oxygen plasma clean of DRIE residue with yield engineering system (YES) Plasma recipe 2 (800 W, 360 seconds, 80 sccm $O_2$, 150° C. is performed. Bonding is performed with NOA 81 UV glue.

Electrode Deposition.

Perform oxygen plasma cleanup of deep reactive ion etching (DRIE) residue with YES Plasma recipe 2 (800 W, 360 sec, 80 sccm $O_2$, 150° C.). Using CEE100B, spin LOR-10B. 5 sec @ 500 rpm (spread)+30 sec @ 3000 rpm (spin). Bake at 190° C. for 6 min on a hotplate. Using the CEE100B, spin S1813. 5 sec @ 500 rpm (spread)+30 sec @ 4000 rpm (spin). Bake at 115° C. for 4 min on a hotplate covered by a wipe. Use back side alignment and expose t=6.3 sec SOFT contact on MA/BA. Develop on the CEE Developers. Run AZ726 mif developer 30 sec single pour (SP). Check the lithography for complete development and undercut using the optical microscope. If necessary, continue development using the AZ726 10 sec SP recipe. Confirm the back side alignment is good using the IR microscope. Immediately prior to the metal evaporation, run a quick O2 plasma descum on the YES Plasma (100 W, 120 sec, 35 sccm, 60° C.). Run the Enerjet Evaporator to deposit Ti (300 Å, 10 Å/sec), Pt (500 Å, 5 Å/s) once the base pressure drops below 2 μTorr. Soak wafers in Remover PG overnight to initiate liftoff. Transfer wafers (2 at a time, maximum) to fresh, hot (80° C.) MicroChem Remover PG and soak for 20 minutes. Rinse wafers with IPA to remove particles. Then QDR and $N_2$ dry. Repeat the same process on the other glass side. FIG. 27D shows the electrode disposed on the detector. FIG. 28 shows a case with ports for nuts connection. The detector can be placed within the case to simplify its use. FIG. 29A is a photograph of the detector. Here, the detector is activated to generate plasma that emits ultraviolet light from helium (He). FIG. 29B is a photograph of the detector, wherein the detector is not activated to generate plasma The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A discharge ionization current detector for ionizing and detecting a sample component where the sample component is ionized by UV light, the detector comprising:
   a UV light source;
   a microfluidic channel having a first surface comprising an electrode and an opposing second surface comprising an electrode, one of the first surface and the second surface being a collection electrode and the other of the first surface and the second surface being a bias electrode, the microfluidic channel being configured to receive a sample component; and
   a wall separating the UV light source from the microfluidic channel, the wall comprising an aperture that inhibits electric arc and plasma from passing therethrough,
   wherein the microfluidic channel is in fluid communication with the UV light source such that, when activated, UV light from the UV light source can enter the microfluidic channel and ionize the sample component, which releases an electron, and the ionized sample component and electron are detected by the collection and bias electrodes.

2. The discharge ionization current detector according to claim 1, wherein the UV light source comprises a plasma generation means comprising a first plasma induction electrode and an opposing second plasma induction electrode, wherein the first and second plasma induction electrodes are disposed on opposing dielectric barrier layers.

3. The discharge ionization current detector according to claim 2, wherein the dielectric barrier layers individually have a thickness of greater than or equal to about 1 μm to less than or equal to about 500 μm.

4. The discharge ionization current detector according to claim 2, wherein the plasma induction electrodes have a distance therebetween of below 3 mm.

5. The discharge ionization current detector according to claim 2, wherein the dielectric barrier layers of the plasma generation means individually have a thickness of greater than or equal to about 1 μm to less than or equal to about 500 μm and the plasma induction electrodes have a distance therebetween of less than or equal to about 3 mm.

6. The discharge ionization current detector according to claim 1, wherein the microfluidic channel further comprises at least one sample component inlet portion at a first end and at least one outlet portion, such that the at least one sample component inlet portion allows a sample component to flow through the microfluidic channel and be ionized by UV light and the outlet portion allows ionized sample component to be removed from the detector.

7. The discharge ionization current detector according to claim 6, further comprising an outlet channel that extends from the microfluidic channel to the outlet portion.

8. The discharge ionization current detector according to claim 1, wherein the UV light source comprises a plasma generation means comprising:

a first dielectric barrier layer having a first conductive material disposed on a first exposed surface of the first dielectric barrier layer; and an opposing second dielectric barrier layer having a second conductive material disposed on a second exposed surface, wherein a plasma-generation void is defined between the first and second dielectric barriers, the plasma-generation void being either a plasma-generation channel or a plasma-generation chamber.

9. The discharge ionization current detector according to claim 8, wherein the plasma-generation void is a plasma-generation chamber having a volume of greater than or equal to about 1 mm$^3$ to less than or equal to about 20 mm$^3$.

10. A discharge ionization current detector for ionizing and detecting a sample component where the sample component is ionized using plasma created by discharge, comprising:
 a sample component detection portion comprising a sample component inlet, a microfluidic channel extending from the inlet, a first electrode having a surface that defines a first side wall of the microfluidic channel, and a second electrode having a surface that defines a second side wall of the microfluidic channel, the second side wall being opposite the first side wall, wherein the microfluidic channel has a width defined by the space between the first electrode and the second electrode of greater than or equal to about 1 μm to less than or equal to about 1 mm; and
 a plasma generation portion comprising a gas inlet, a plasma-generation void defined between a bottom dielectric barrier layer and a top dielectric barrier layer and in fluid communication with the gas inlet, the top dielectric barrier being opposite the bottom dielectric barrier, wherein the bottom dielectric barrier layer and the top dielectric barrier layer independently have a thickness of greater than or equal to about 1 μm to less than or equal to about 500 μm,
 wherein the microfluidic channel of the sample component detection portion is in fluid communication with the plasma-generation void of the plasma generation portion.

11. The discharge ionization current detector according to claim 10, further comprising;
 a first sample component outlet channel extending from the microfluidic channel to a first sample component outlet at a side of the detector, wherein one of a second surface of the first electrode and a second surface of the second electrode defines a side wall of the first sample component outlet channel.

12. The discharge ionization current detector according to claim 11, further comprising; a second sample component outlet channel extending from the microfluidic channel to a second sample component outlet at a side of the detector, wherein the other of the second surface of the first electrode or the second surface of the second electrode defines a side wall of the second sample component outlet channel.

13. The discharge ionization current detector according to claim 12, wherein the first outlet channel is longitudinally bifurcated by a wall having an aperture that blocks electric arc or plasma from entering the sample component detection portion.

14. The discharge ionization current detector according to claim 13, wherein the wall separates the plasma generation portion from the sample component detection portion.

15. The discharge ionization current detector according to claim 10, wherein the plasma-generation void is a plasma-generation chamber having a volume of greater than or equal to about 1 mm$^3$ to less than or equal to about 20 mm$^3$.

16. The discharge ionization current detector according to claim 10, wherein guard columns are disposed in the sample component inlet and the gas inlet.

17. A method of detecting a sample component, the method comprising:
 generating plasma that emits ionizing light in a plasma-generation void defined between a bottom dielectric barrier layer and a top dielectric barrier layer, the bottom dielectric barrier layer and the top dielectric barrier layer independently having a thickness of greater than or equal to about 1 μm to less than or equal to about 500 μm;
 applying a bias voltage across a microfluidic channel disposed between a first electrode that defines a first wall of the microfluidic channel and a second electrode that defines a second wall of the microfluidic channel, the second wall being opposite to the first wall at a distance of greater than or equal to about 1 μm to less than or equal to about 1 mm;
 delivering a sample component through the microfluidic channel, wherein the ionizing light contacts the sample component and ionizes the sample component to generate a sample component cation and an electron; and
 detecting the sample component cation and electron at the first and second electrodes.

18. The method according to claim 17, wherein the plasma is generated from a gas selected from the group consisting of helium (He), Neon (Ne), Argon (Ar), Krypton (Kr), nitrogen (N$_2$), and a combination thereof.

19. The method according to claim 17, wherein the ionizing light passes through an aperture of a wall prior to contacting and ionizing the sample component, and wherein the wall inhibits the plasma from contacting the sample component and the electrodes.

20. The method according to claim 17, comprising separating the sample component from a sample mixture by gas chromatography prior to the delivering.

* * * * *